US012467273B2

(12) United States Patent
Davis et al.

(10) Patent No.: US 12,467,273 B2
(45) Date of Patent: *Nov. 11, 2025

(54) VEHICLE TENT

(71) Applicant: Go Fast Campers LLC, Belgrade, MT (US)

(72) Inventors: Wiley Christopher Davis, Manhattan, MT (US); Skylar Bruce Sullivan, Belgrade, MT (US); Stephan JohnFrancois Morris, Manhattan, MT (US)

(73) Assignee: Go Fast Campers LLC, Belgrade, MT (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/668,045

(22) Filed: May 17, 2024

(65) Prior Publication Data

US 2024/0301715 A1 Sep. 12, 2024

Related U.S. Application Data

(63) Continuation of application No. 17/535,192, filed on Nov. 24, 2021, now Pat. No. 12,018,503.

(Continued)

(51) Int. Cl.
*E04H 15/06* (2006.01)
*B60J 7/16* (2006.01)
(Continued)

(52) U.S. Cl.
CPC ............ *E04H 15/06* (2013.01); *B60J 7/1607* (2013.01); *B60P 3/38* (2013.01); *E04H 15/008* (2013.01);
(Continued)

(58) Field of Classification Search
CPC ...... B60P 3/34; B60P 3/38; B60P 3/39; E04H 15/02
See application file for complete search history.

(56) References Cited

U.S. PATENT DOCUMENTS 3,190,689 A 6/1965 Calthorpe
3,292,971 A * 12/1966 Zucker .................... B60P 3/343
296/100.1

(Continued)

OTHER PUBLICATIONS

"Best way to make a soft top pop up?", Expedition Portal, downloaded from https://expeditionportal.com/forum/threads/best-way-to-make-a-soft-top-pop-up.169587/ on Feb. 12, 2021, believed to have published before Nov. 25, 2020.

(Continued)

*Primary Examiner* — David R Dunn
*Assistant Examiner* — Danielle Jackson
(74) *Attorney, Agent, or Firm* — Knobbe, Martens, Olson & Bear, LLP

(57) ABSTRACT

Disclosed herein are embodiments of a roof top tent system, that can include a lower frame portion coupleable with a bed of a truck, an upper frame portion coupleable with the lower frame portion, a platform assembly coupleable with the upper frame portion of the frame assembly, including an upper platform portion, a lower platform portion coupleable with the upper frame portion of the frame assembly along a first end portion of the lower and upper platform portions, and a platform hinge configured to hingedly couple the lower platform portion with the upper platform portion so that the upper platform portion can rotate between a first position in which the upper platform portion is substantially parallel to and adjacent to the lower platform portion and a second position in which the upper platform portion extends at an angle away from the lower platform portion.

20 Claims, 19 Drawing Sheets

Related U.S. Application Data

(60) Provisional application No. 63/118,618, filed on Nov. 25, 2020.

(51) Int. Cl.
*B60P 3/34* (2006.01)
*B60P 3/38* (2006.01)
*E04H 15/00* (2006.01)
*E04H 15/48* (2006.01)
*E04H 15/64* (2006.01)

(52) U.S. Cl.
CPC ........... *E04H 15/48* (2013.01); *E04H 15/644* (2013.01); *B60P 3/341* (2013.01); *E04H 15/64* (2013.01)

(56) References Cited

U.S. PATENT DOCUMENTS

| | | |
|---|---|---|
| 3,411,819 A | 11/1968 | Tyree et al. |
| 3,603,330 A | 9/1971 | Halldorson et al. |
| 3,924,365 A | 12/1975 | Orberg |
| 3,953,066 A | 4/1976 | Hamilton |
| 4,176,873 A | 12/1979 | Barr et al. |
| 4,802,501 A | 2/1989 | Hall, II |
| 5,788,319 A | 8/1998 | Pruitt |
| 6,394,531 B2 | 5/2002 | Thompson et al. |
| D574,315 S | 8/2008 | Swails et al. |
| 8,182,020 B2 | 5/2012 | Herndon |
| 10,086,684 B1 | 10/2018 | Stamm |
| 10,596,951 B1 | 3/2020 | Williams |
| 10,829,028 B2 | 11/2020 | Delgadillo |
| 11,371,255 B2 | 6/2022 | Frederickson |
| D968,309 S | 11/2022 | Robinson |
| 11,988,006 B1 * | 5/2024 | Gauthier ................. B32B 5/18 |
| 2019/0202333 A1 | 7/2019 | Delgadillo |
| 2021/0025190 A1 | 1/2021 | Montesalvo et al. |
| 2022/0162878 A1 | 5/2022 | Burnett |
| 2024/0268574 A1 * | 8/2024 | Gauthier ................. B32B 5/18 |
| 2025/0187525 A1 * | 6/2025 | Grajo ....................... B60P 3/38 |

OTHER PUBLICATIONS

"Hondo Garage's New Thing", Tacoma World, downloaded from https://www.tacomaworld.com/threads/hondo-garages-new-thing.516490/ on Feb. 12, 2021, believed to have published before Nov. 25, 2020.

"Roninjiro aluminum Nissan D40 camper", Expedition Portal, downloaded from https://expeditioniportal.com/forum/threads/roninjiro-aluminum-nissan-d40-camper.100864/page-6 on Feb. 12, 2021, believed to have published before Nov. 25, 2020.

"Lightweight Homebuilt Camper for my Tacoma", Expedition Portal, downloaded from https://expeditionportal.com/forum/threads/lightweight-homebuilt-camper-for-my-tacoma.95671/page-11 on Feb. 12, 2021, believed to have published before Nov. 25, 2020.

H2UBE Keder Welt—4MM, Rochford Supply, downloaded from https://rochfordsupply.com/shop/awning/hardware/h2ube_Keder_Welt_-_4_mm/index.html on Feb. 12, 2021, believed to have published before Nov. 25, 2020.

GFC Platform Camper product details from web.archive.org/web/20171223042450/https://www.gofastcampers.com dated Dec. 11, 2017.

Screenshots of "Bigfoot Country: The Adventures of Woody and the Blue Ox" video hosted on Vimeo at https://vimeo.com/86202138, believed to have published before Nov. 25, 2020.

\* cited by examiner

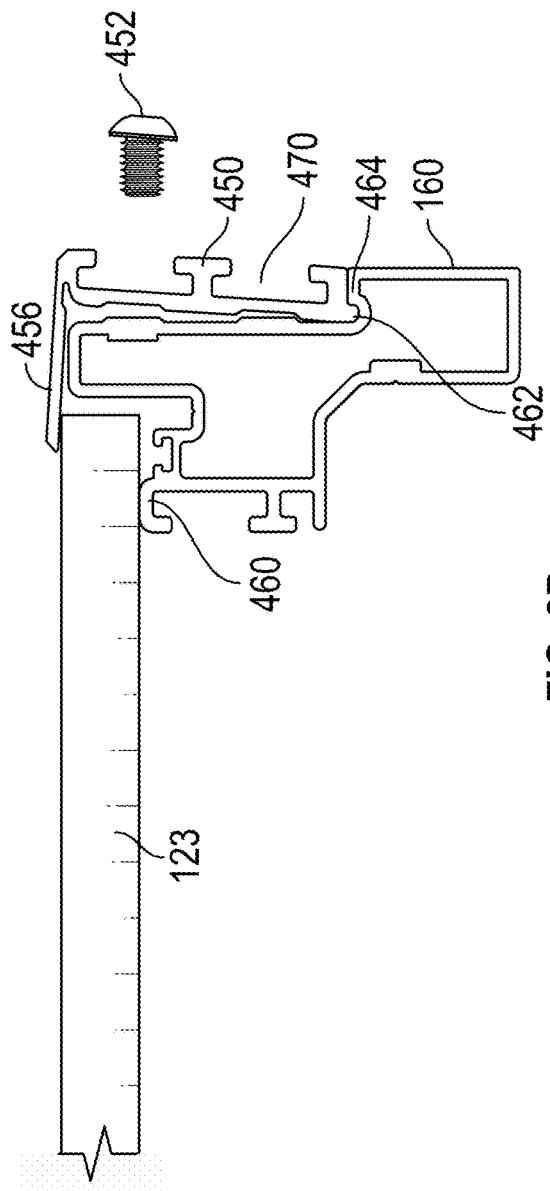
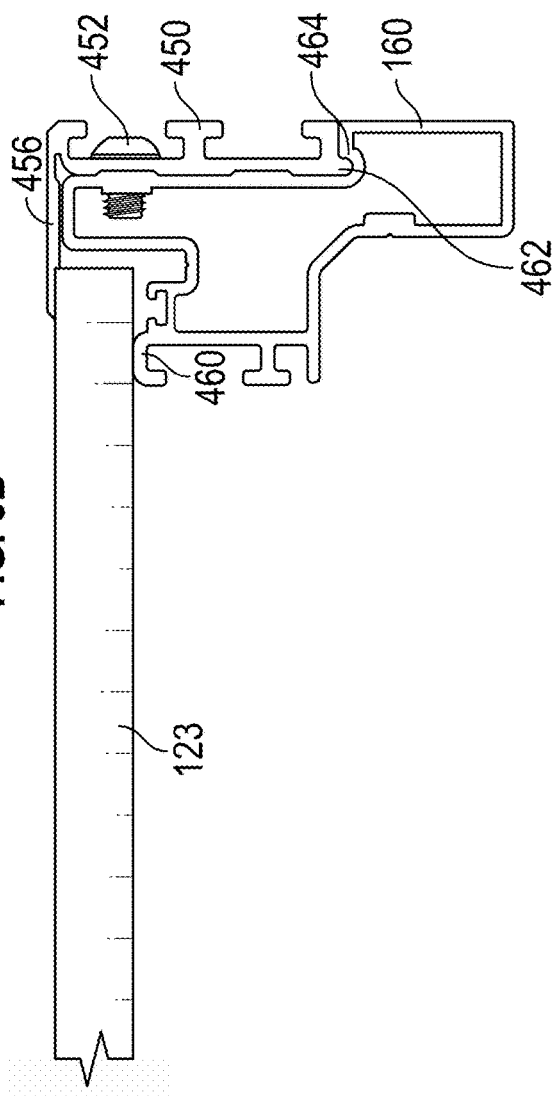
FIG. 8B
FIG. 8C

VEHICLE TENT

PRIORITY CLAIM AND INCORPORATION BY REFERENCE

The present application is a continuation of U.S. application Ser. No. 17/535,192 filed on Nov. 24, 2021, which claims the benefit under 35 U.S.C. § 119(e) to U.S. Patent Application No. 63/118,618, filed on Nov. 25, 2020, titled VEHICLE TENT, the contents of which are hereby incorporated by reference herein in their entirety as if fully set forth herein for all purposes. Any and all applications for which a foreign or domestic priority claim is identified in the Application Data Sheet as filed with the present application are hereby incorporated by reference herein in their entirety and made a part of this specification.

FIELD OF THE DISCLOSURE

Embodiments of the present disclosure relate to tents for camping, for example, tents configured for use on a vehicle.

BACKGROUND

Car camping is a very popular activity. But, with limited ground space in most campsites and the desire to be isolated from wet and/or cold surfaces, there is a benefit to having a tent on the top surface of a vehicle. Conventional roof top tents for trucks can also be large and bulky, which can make shipping very expensive.

SUMMARY OF SOME EXEMPLIFYING EMBODIMENTS

The systems, methods and devices of this disclosure each have several innovative aspects, implementations, or aspects, no single one of which is solely responsible for the desirable attributes disclosed herein.

Disclosed herein are embodiments of a roof top tent system, that can include a lower frame portion coupleable with a bed of a truck, an upper frame portion coupleable with the lower frame portion, a platform assembly coupleable with the upper frame portion of the frame assembly, including an upper platform portion, a lower platform portion coupleable with the upper frame portion of the frame assembly along a first end portion of the lower and upper platform portions, and a platform hinge configured to hingedly couple the lower platform portion with the upper platform portion so that the upper platform portion can rotate between a first position in which the upper platform portion is substantially parallel to and adjacent to the lower platform portion and a second position in which the upper platform portion extends at an angle away from the lower platform portion. In any embodiments disclosed herein, the platform hinge can include a first platform hinge member that is coupled with the lower platform portion and includes a plurality of gear teeth, and a second platform hinge member that is coupled with the upper platform portion and includes a plurality of gear teeth configured to mesh with and rotate relative to the plurality of gear teeth of the first platform hinge member. Further, any embodiments of the roof top tent system disclosed herein can include a fabric cover covering at least the upper platform portion and extending from the upper platform portion to the lower platform portion to form an openable enclosure between the upper and lower platform portions.

Also disclosed herein are embodiments of a roof top tent system, that can include a frame assembly, a platform assembly coupled with the frame assembly, including an upper platform portion, a lower platform portion coupleable with the upper frame portion of the frame assembly along a first end portion of the lower and upper platform portions, a fabric cover covering at least the upper platform portion and extending from the upper platform portion to the lower platform portion to form an openable enclosure between the upper and lower platform portions, and a platform hinge configured to hingedly couple the lower platform portion with the upper platform portion so that the upper platform portion can rotate between a first position in which the upper platform portion is substantially parallel to and adjacent to the lower platform portion and a second position in which the upper platform portion extends at an angle away from the lower platform portion. In any embodiments disclosed herein, the platform hinge can include a first platform hinge member that includes a plurality of gear teeth, and a second platform hinge member that includes a plurality of gear teeth configured to mesh with and rotate relative to the plurality of gear teeth of the first platform hinge member. In some embodiments, the first platform hinge member can be configured to be stationary and the second hinge member can be configured to rotate relative to the first platform hinge member. Further, in some embodiments, at least one of the first and second platform hinge members is coupled with the upper platform portion and the other of the first and second platform hinge members is coupled with the lower platform portion.

Also disclosed herein are embodiments of a method of expanding a collapsible roof top tent system, including rotating an upper platform portion about a hinge from a first position in which the upper platform portion is adjacent to a lower platform portion to a second position in which the upper platform portion is rotated away from the lower platform portion to expand an interior space of the roof top tent system, and supporting the upper platform portion in the second position to at least inhibit the upper platform portion from rotating back from the second position to the first position. In some embodiments, the hinge can include a first hinge member and a second hinge member, wherein the first hinge member includes a plurality of teeth configured to mesh with and rotate relative to a plurality of teeth of the second hinge member as the upper platform portion is rotated relative to the lower platform portion;

Any embodiments of the roof top tent systems and methods disclosed herein can include, in additional embodiments, one or more of the following steps, features, components, and/or details, in any combination with any of the other steps, features, components, and/or details of any other embodiments disclosed herein: wherein the lower frame portion includes a first side member, a second side member, and a first end member and the upper frame portion includes a first side member, second side member, a first end member, and a second end member; wherein the first side member, the second side member, and the first end member of the lower frame portion of the frame assembly and the first side member, the second side member, the first end member, and the second end member of the upper frame portion of the frame assembly are made from extruded aluminum; wherein the first side member, the second side member, and the first end member of the lower frame portion of the frame assembly are configured to be removably coupleable together using connectors including a plurality of bolts or screws; wherein the first side member, the second side member, and the first end member of the lower frame portion of the frame assembly are configured to be removably coupleable together using connectors including a plurality of bolts or screws and a plurality of brackets; wherein the first side member, the second side member, the first end member, and the second end member of the upper frame portion of the frame assembly are configured to be removably coupleable together using connectors including a plurality of bolts or screws; wherein the first side member, the second side member, the first end member, and the second end member of the upper frame portion of the frame assembly are configured to be removably coupleable together using connectors including a plurality of bolts or screws and a plurality of brackets; wherein the frame assembly includes a plurality of connecting members connecting the lower frame portion to the upper frame portion of the frame assembly; wherein the plurality of connecting members include four connecting members, wherein each of the four connecting members are coupled with a corner portion of the lower frame portion and the upper frame portion; further including a first pair of angled struts coupling the first side member of the lower frame portion with the first side member of the upper frame portion; further including a second pair of angled struts coupling the second side member of the lower frame portion with the second side member of the upper frame portion; further including a third pair of angled struts coupling the first end member of the lower frame portion with the first end member of the upper frame portion; further including a pair of bed clamps coupled with the frame assembly, the bed clamps configured to selectively couple the frame assembly with a bed portion of a truck; wherein bed clamps are coupled with the lower frame portion of the frame assembly; wherein the lower platform portion includes a first side member, a second side member, a first end member, and a second end member, and the upper platform portion includes a first side member, second side member, a first end member, and a second end member; wherein the first side member, the second side member, the first end member, and the second end member of the lower platform portion and the first side member, the second side member, the first end member, and the second end member of the upper platform portion are made from extruded aluminum; wherein the first side member, the second side member, the first end member, and the second end member of the lower platform portion are configured to be removably coupleable together using connectors including a plurality of bolts or screws; wherein the first side member, the second side member, the first end member, and the second end member of the lower platform portion are configured to be removably coupleable together using connectors including a plurality of bolts or screws and a plurality of brackets; and/or wherein the first side member, the second side member, the first end member, and the second end member of the upper platform portion are configured to be removably coupleable together using connectors including a plurality of bolts or screws;

Any embodiments of the roof top tent systems and methods disclosed herein can include, in additional embodiments, one or more of the following steps, features, components, and/or details, in any combination with any of the other steps, features, components, and/or details of any other embodiments disclosed herein: wherein the first side member, the second side member, the first end member, and the second end member of the upper platform portion are configured to be removably coupleable together using connectors including a plurality of bolts or screws and a plurality of brackets; further including a first and a second lift strut configured to bias the upper platform portion toward the second position; wherein the first and second lift struts are coupled with an inside surface of the upper platform portion and the lower platform portion; further including at least one latch element configured to selectively secure the upper platform portion in the first position; wherein the platform assembly further includes a honeycomb roof panel and a clamp mechanism configured to couple the honeycomb roof panel to the lower platform portion of the platform assembly; wherein the platform hinge further includes a platform hinge connecting element having a first rounded projection configured to be received within a first round shaped slot in the first platform hinge member and a second rounded projection configured to be received within a first rounded slot in the second platform hinge member, wherein the first and second rounded projections each has a round cross-sectional shape; wherein the connecting element includes a projection configured to limit an angle of rotation of the second platform hinge member and the upper platform portion relative to the first platform hinge member and the lower platform portion; wherein the platform hinge extends along all or substantially all of a length of the first end portion of the lower and upper platform portions; wherein the platform hinge further includes a projection configured to partially cover and/or extend over other portions of the platform hinge and to direct water away from the platform hinge; further including a first side panel supported by a first side of the frame assembly, a second side panel supported by a second side of the frame assembly opposite to the first side of the frame assembly, a first end panel supported by a first end of the frame assembly, and a second end panel supported by a second end of the frame assembly; wherein the first and second side panels and the first and second end panels are made from aluminum; further including at least one lift strut configured to bias the end panel toward the open position, at least one lift strut configured to bias the first side panel toward the open position, and at least one lift strut configured to bias the second side panel toward the open position; and/or further including at least one latch element configured to selectively secure the end panel in the closed position, at least one latch element configured to selectively secure the first side panel in the closed position, and at least one latch element configured to selectively secure the second side panel in the closed position.

Any embodiments of the roof top tent systems and methods disclosed herein can include, in additional embodiments, one or more of the following steps, features, components, and/or details, in any combination with any of the other steps, features, components, and/or details of any other embodiments disclosed herein: wherein the first end panel is selectively movable or rotatable relative to the frame assembly between an open and a closed position; further including an end panel hinge adjacent to a top edge portion of the first end panel configured to hingedly couple the first end panel with the frame assembly so that the first end panel can rotate between the open and closed positions, the end panel hinge including: a first hinge member that is coupleable with the upper frame portion and includes a plurality of gear teeth, and a second hinge member that is coupleable with the first end panel and includes a plurality of gear teeth configured to mesh with and rotate relative to the plurality of gear teeth of the first hinge member of the end panel hinge; wherein the end panel hinge further includes a connecting element having a first rounded projection configured to be received within a first rounded slot in the first hinge member of the end panel hinge and a second rounded projection configured to be received within a second rounded slot in the second hinge member of the end panel hinge, wherein the first and second rounded projections of the end panel hinge each has a round cross-sectional shape; wherein the connecting element of the end panel hinge includes a projection configured to limit an angle of rotation of the second hinge member of the end panel hinge and the first end panel relative to the first hinge member of the end panel hinge or is otherwise configured to limit an angle of rotation of the second hinge member of the end panel hinge and the first end panel relative to the first hinge member of the end panel hinge; wherein the end panel hinge extends along all or substantially all of a length of the first end panel; wherein the end panel hinge further includes a projection configured to partially cover and direct water away from the end panel hinge; and/or wherein the first end panel includes at least one bend to increase a rigidity of the first end panel.

Any embodiments of the roof top tent systems and methods disclosed herein can include, in additional embodiments, one or more of the following steps, features, components, and/or details, in any combination with any of the other steps, features, components, and/or details of any other embodiments disclosed herein: wherein the first side panel is selectively movable or rotatable relative to the frame assembly between an open and a closed position; further including a first side panel hinge adjacent to a top edge portion of the first side panel configured to hingedly couple the first side panel with the frame assembly so that the first side panel can rotate between the open and closed positions, the first side panel hinge including: a first hinge member that is coupleable with the upper frame portion and includes a plurality of gear teeth, and a second hinge member that is coupleable with the first side panel and includes a plurality of gear teeth configured to mesh with and rotate relative to the plurality of gear teeth of the first hinge member of the first side panel hinge; wherein the first side panel hinge further includes a connecting element having a first rounded projection configured to be received within a first rounded slot in the first hinge member of the first side panel hinge and a second rounded projection configured to be received within a second rounded slot in the second hinge member of the first side panel hinge; wherein the connecting element of the first side panel hinge includes a projection configured to limit an angle of rotation of the second hinge member of the first side panel hinge and the first side panel relative to the first hinge member of the first side panel hinge; wherein the first side panel hinge extends along all or substantially all of a length of the first side panel; wherein the first side panel hinge further includes a projection configured to partially cover and direct water away from the first side panel hinge; and/or wherein the first side panel includes at least one bend or flange to increase a rigidity of the first side panel;

Any embodiments of the roof top tent systems and methods disclosed herein can include, in additional embodiments, one or more of the following steps, features, components, and/or details, in any combination with any of the other steps, features, components, and/or details of any other embodiments disclosed herein: wherein the second side panel is selectively movable or rotatable relative to the frame assembly between an open and a closed position; further including a second side panel hinge adjacent to a top edge portion of the second side panel configured to hingedly couple the second side panel with the frame assembly so that the second side panel can rotate between the open and closed positions, the second side panel hinge including: a first hinge member that is coupleable with the upper frame portion and includes a plurality of gear teeth, and a second hinge member that is coupleable with the second side panel and includes a plurality of gear teeth configured to mesh with and rotate relative to the plurality of gear teeth of the first hinge member of the second side panel hinge.

Any embodiments of the roof top tent systems and methods disclosed herein can include, in additional embodiments, one or more of the following steps, features, components, and/or details, in any combination with any of the other steps, features, components, and/or details of any other embodiments disclosed herein: wherein the second side panel hinge further includes a connecting element having a first rounded projection configured to be received within a first rounded slot in the first hinge member of the second side panel hinge and a second rounded projection configured to be received within a second rounded slot in the second hinge member of the second side panel hinge; wherein the connecting element of the second side panel hinge includes a projection configured to limit an angle of rotation of the second hinge member of the second side panel hinge and the second side panel relative to the first hinge member of the second side panel hinge; wherein the second side panel hinge extends along all or substantially all of a length of the second side panel; wherein the second side panel hinge further includes a projection configured to partially cover and direct water away from the second side panel hinge; wherein the second side panel includes at least one bend or flange to increase a rigidity of the second side panel; further including a removable accessory track coupleable with a side member of the lower platform portion, the accessory track extending along all or substantially all or along a portion of a length of the side member of the lower platform portion; wherein the accessory track is removably coupleable with the side member of the lower platform portion; wherein the side member of the lower platform portion includes a channel sized and configured to receive and support the accessory track; wherein the accessory track includes one or more slots therein configured to receive connector elements so that a user can couple one or more accessories to the accessory track; wherein the accessory track is made from extruded aluminum; further including a plurality of seals coupled with a plurality of channels in the frame assembly, the plurality of seals configured to inhibit water, dust, air, and other contaminants from entering the roof top tent system; further including one or more billet members coupled with one or more end portions of the frame assembly; wherein the fabric cover includes at least one zippered openings therein; wherein the fabric cover is coupled with the frame assembly using a keder cord configured to couple with one or more track features of the lower platform portion and the upper platform portion of the platform assembly; and/or wherein tent system can be configured to be shippable in a flat package.

Also disclosed herein are embodiments of a method of assembling a tent system over at least a portion of a vehicle substantially as described herein or shown in the accompanying drawings, and embodiments of a tent system substantially as described herein or shown in the accompanying drawings.

BRIEF DESCRIPTION OF THE DRAWINGS

FIGS. 8A-8C show an embodiment of a clamp element that can be used with any embodiments of the roof top tent system disclosed herein to secure or couple the upper panel with the upper frame portion.

DETAILED DESCRIPTION OF SOME EXEMPLIFYING EMBODIMENTS

Figure 1A:
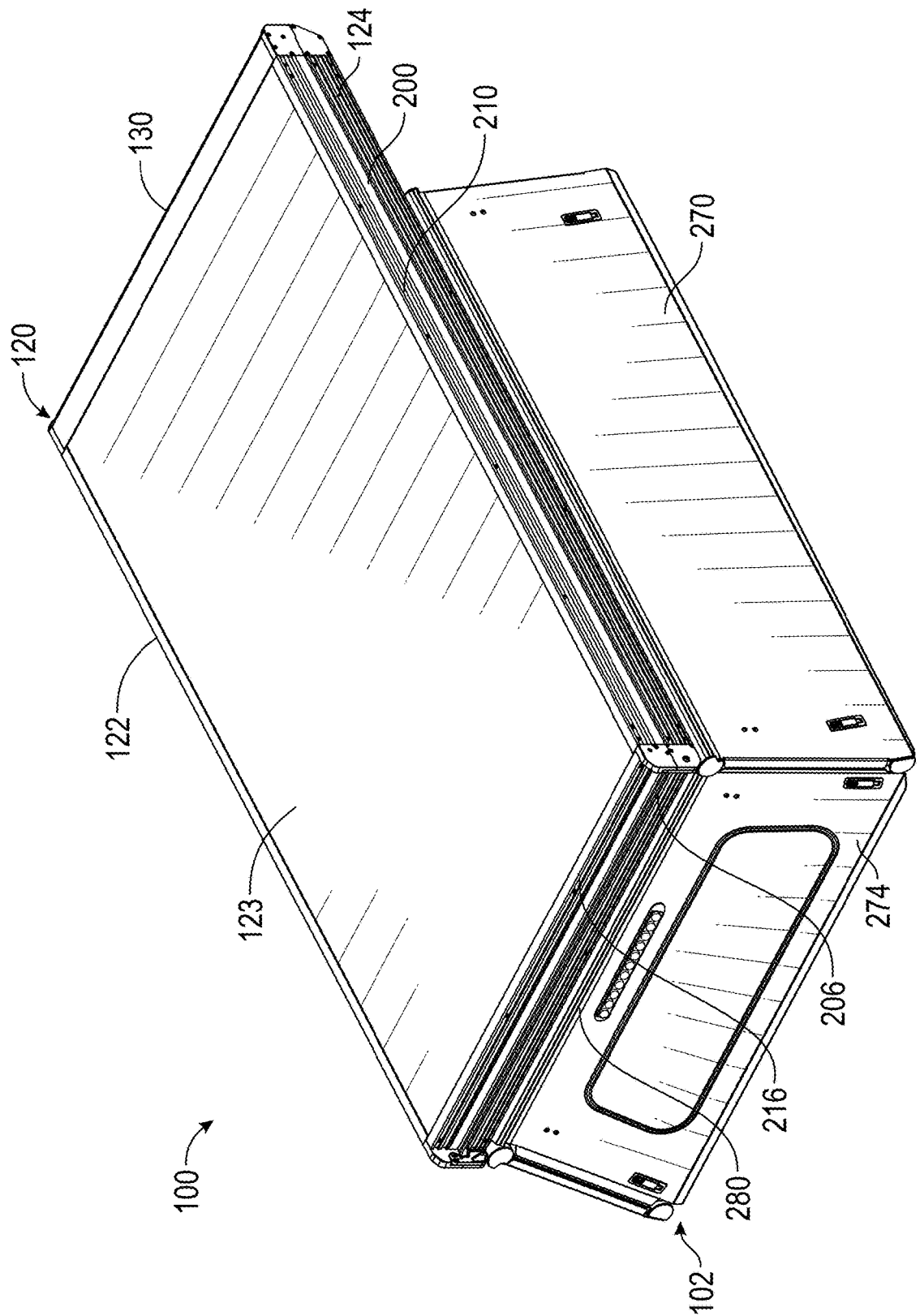
FIGS. 1A-1D are orthogonal views showing an embodiment of a roof top tent system, showing the platform assembly in a closed position.
Figure 1B:
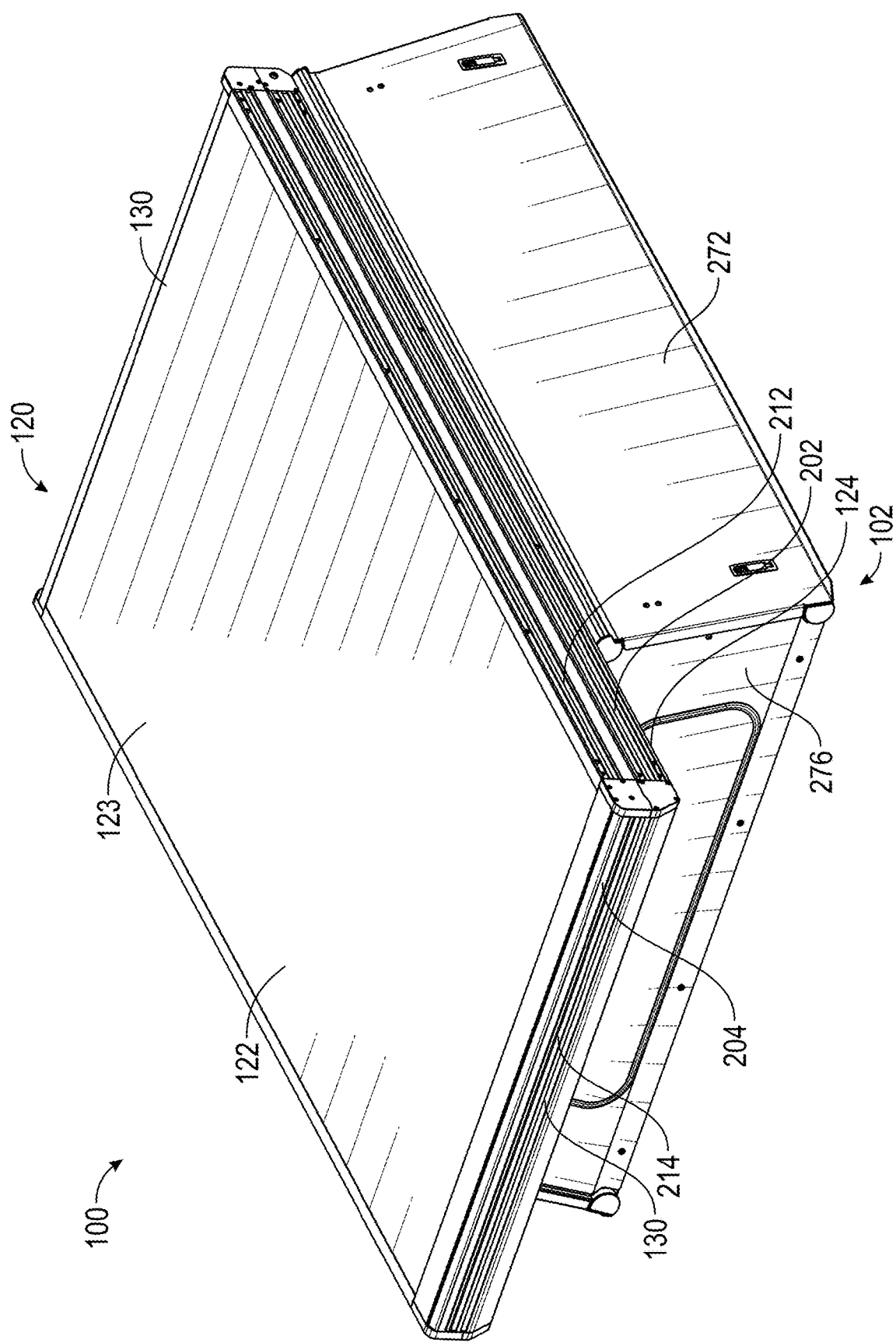
Figure 1C:
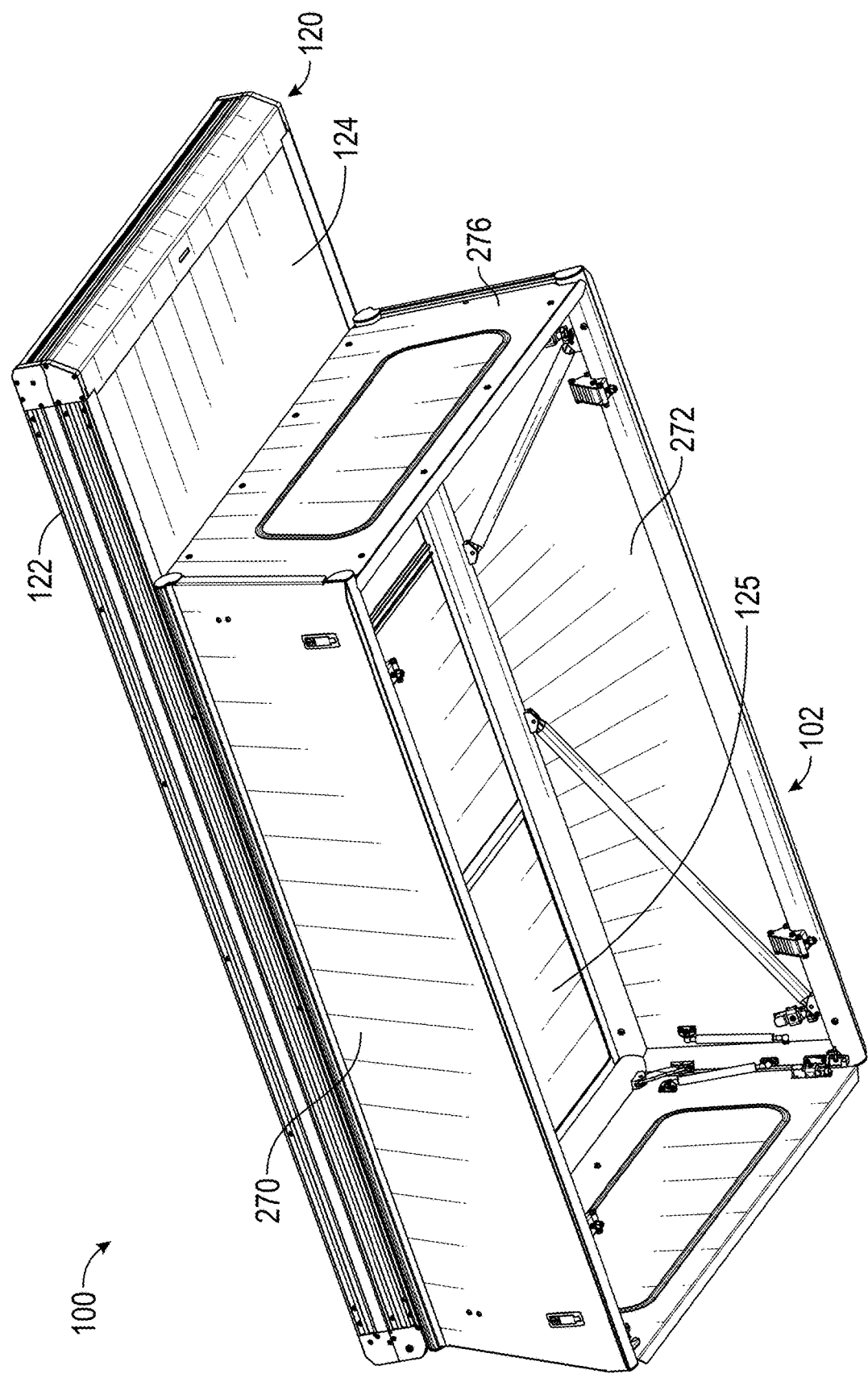
Figure 1D:
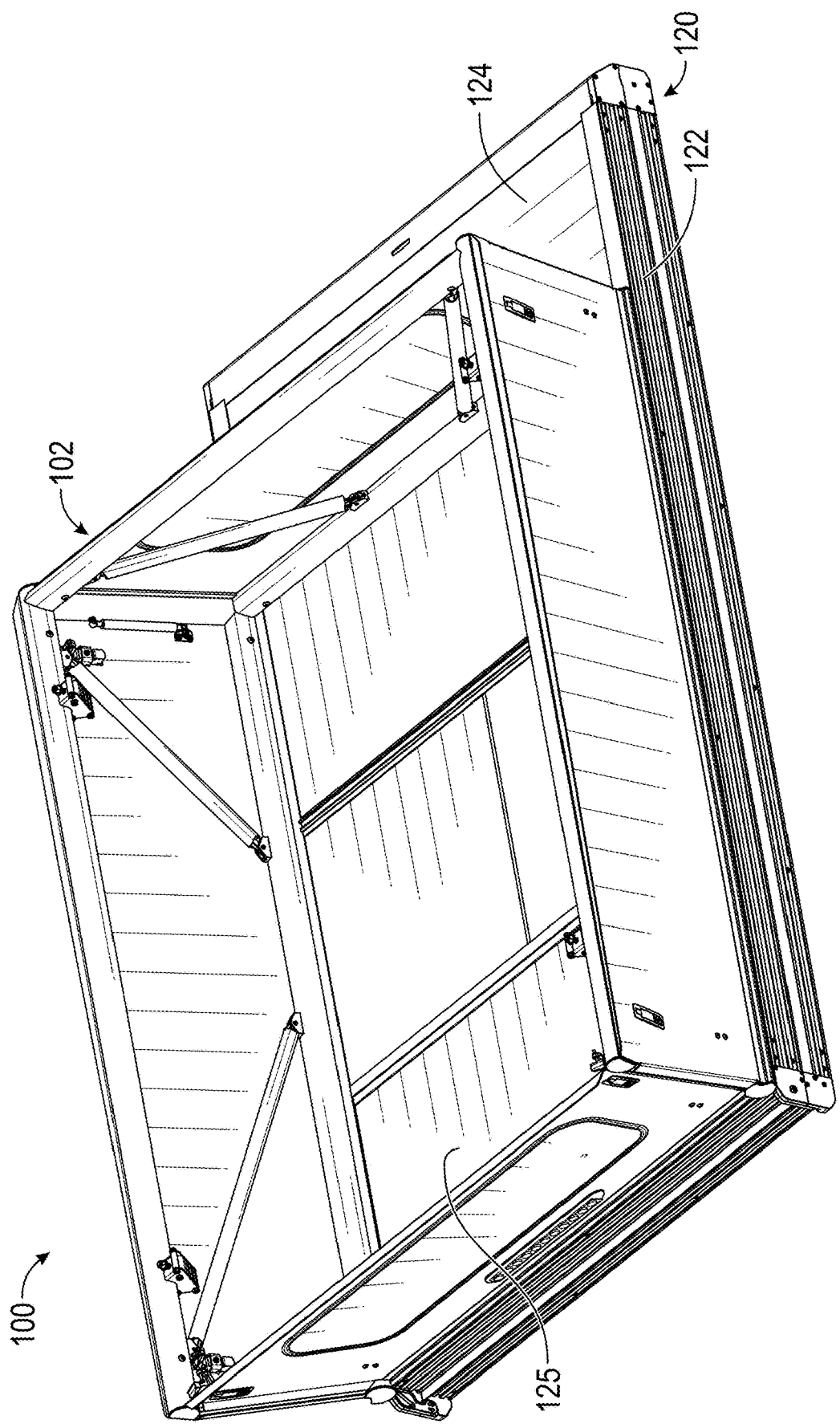

Some embodiments have a frame configured to be coupled with a truck bed, wherein the frame can be mode from anodized aluminum custom extrusions, which can be machined for fit and function and joined with hardware and unique machined parts. In some embodiments, the tent system can be made from panel of aluminum or another suitable material and can include bends and flanges to increase a rigidity of the panels. The bends and flanges can be located at the ends of the panels. The frame can include hinges for the top of the tent structure and any of the side panels can made from a plurality (e.g., without limitation, three) custom designed extruded members that form a geared hinging mechanism. One of the hinges having the gear teeth can be a fixed hinge, and another of the hinges can rotate about the fixed hinge. In some embodiments, the features of the fixed hinge can be integrated into or attached to the frame structure. The fixed panel hinge can include a projection or flange to cover the hinge and/or gear components to divert water away from those components.

Some embodiments of the tent system can include an extruded bulb seal that can have a T-shape profile that can integrate into tracks or channels that can be formed in the extruded frame members. Some embodiments can have a honeycomb roof panel and a honeycomb roof panel interface that can include a two-piece clamping mechanism to secure the honeycomb panels in place. The honeycomb panels can form the floor of some embodiments of the rooftop tent system. Any embodiments can have lift struts for rotatable panels located inside the tent frame. Some embodiments can include latches for one or more rotatable panels built into the rear corners of the rooftop tent system. The latches can include a keyed lock. Some embodiments of the tent system can be configured such that a user can latch and unlatch one or more of the panels from inside the camper, for example and without limitation, using a sliding mechanism.

Some embodiments of the rooftop tent system disclosed herein can have features incorporated into the extruded frame members and hardware to actively manage water intrusion to pass through the system and be routed to designated exit points of the system. In some embodiments, the support members for the lower platforms of the tent system can include extruded members and hardware to connect the support members to other members of the frame of the tent system. Further, any embodiments of the tent system can include a fabric tent cover that can be attached to the frame using keder cords and track features that can engage with channels or tracks in the extruded members of the frame to connect the tent cover to the frame. Such components can also provide a sealed interface between the tent cover and the frame.

Some embodiments disclosed herein include a roof top tent system 100 that can include a frame assembly 102 that can include a lower frame portion 108 coupleable with a bed of a truck, an upper frame portion 110 coupleable with the lower frame portion 108, and a platform assembly 120 coupleable with the upper frame portion 110 of the frame assembly 102. In some embodiments, the platform assembly 120 can include an upper platform portion 122 and a lower platform portion 124 coupleable with the upper frame portion 110 of the frame assembly 102 along a first end portion of the lower platform portion 124 and the upper platform portion 122. The upper platform portion 122 can have an upper panel 123. The panel 123 can form a roof for the tent system. Similarly, the lower platform portion 124 can have a lower panel 125 configured to at least support the weight of one or more users thereon. The lower panel 125, in some embodiments, can include multiple different panels.

Further, in any embodiments disclosed herein, the roof top tent system 100 can include the upper platform portion 122 that can be configured for use without the lower platform portion 124 and/or without the frame assembly 102. For example and without limitation, some embodiments of the roof top tent system 100 can include an upper platform portion 122 configured to be secured to or coupled with a top of a car, SUV, truck cab, or other vehicle or object (including stationary objects), including without limitation, to a rack system of a car, SUV, truck, or otherwise. Such embodiments can have brackets, clamps, and/or other fasteners configured to couple with a top of a car, SUV, truck cab, or other vehicle or object.

Figure 6A:
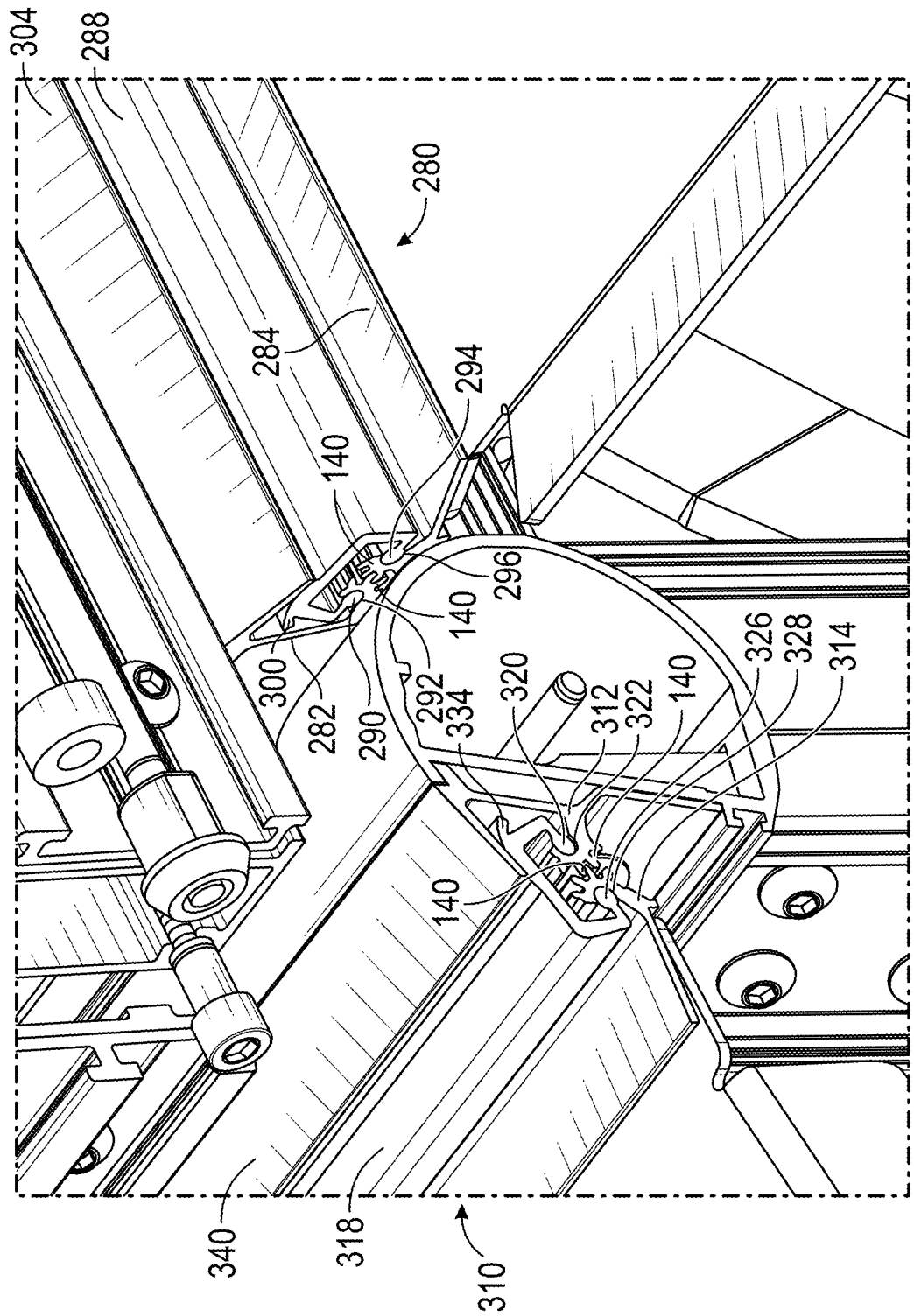
FIG. 6A is an enlarged view of an embodiment of a hinge assembly of the rear panel of the embodiment of the roof top tent system shown in FIGS. 1A-1D.
Figure 6B:
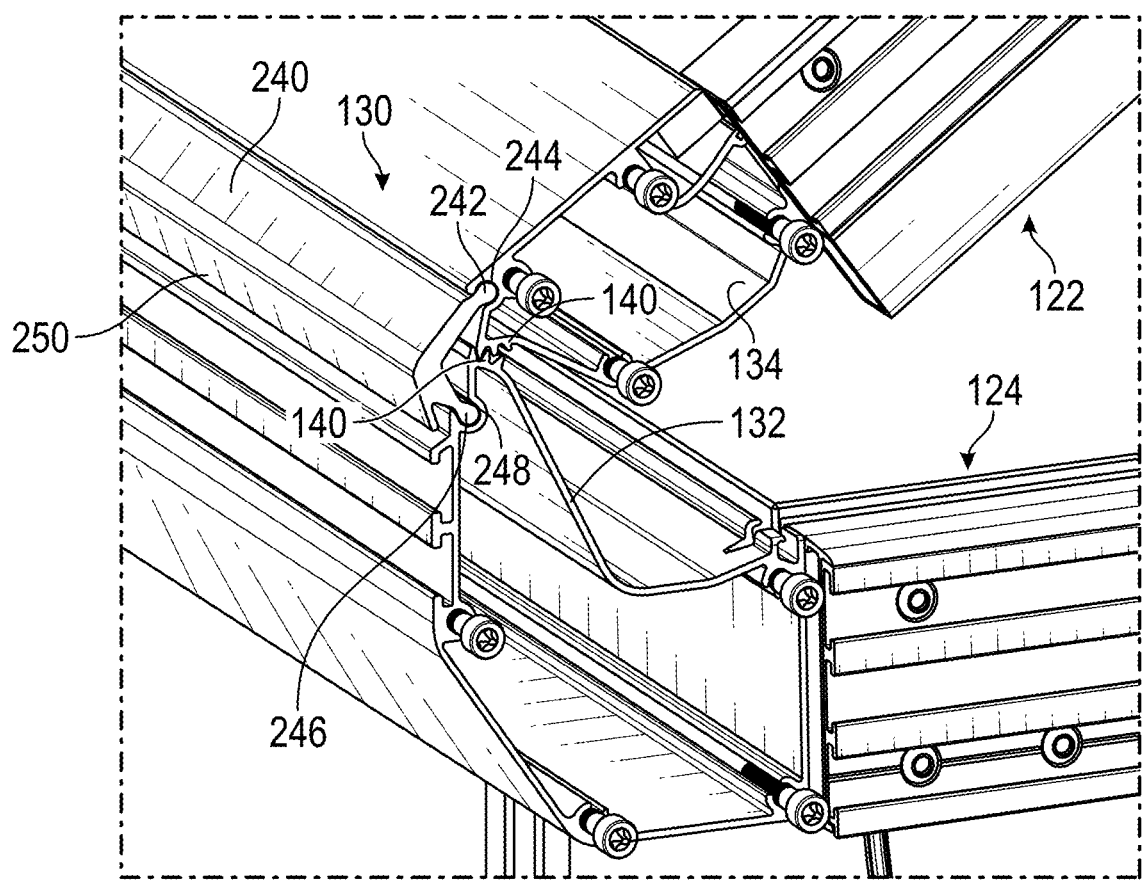
FIG. 6B is an enlarged view of an embodiment of a hinge assembly of the platform assembly of the embodiment of the roof top tent system shown in FIGS. 1A-1D.

In some embodiments, the platform assembly 120 can include a platform hinge 130 configured to hingedly couple the lower platform portion 124 with the upper platform portion 122 so that the upper platform portion 122 can rotate between a first position in which the upper platform portion 122 is substantially parallel to and adjacent to the lower platform portion 124 and a second position in which the upper platform portion 122 can extend at an angle away from the lower platform portion 124. With reference to FIG. 6B, some embodiments of the platform hinge 130 can include a first platform hinge member 132 that can be coupleable with the lower platform portion 124 and can include a plurality of gear teeth 140, and a second platform hinge member 134 that can be coupleable with the upper platform portion 122 and can include a plurality of gear teeth 140 configured to mesh with the plurality of gear teeth 140 of the lower hinge.

Frame Assembly

In some embodiments, the lower frame portion 108 can include a first side member 150, a second side member 152, and a first end member 154 and the upper frame portion 110 can include a first side member 160, second side member 162, a first end member 164, and a second end member 166. Any embodiments of the first side member 150, the second side member 152, and the first end member 154 of the lower frame portion 108 of the frame assembly 102 and the first side member 160, the second side member 162, the first end member 164, and the second end member 166 of the upper frame portion 110 of the frame assembly 102 can be made from extruded aluminum.

In some embodiments, the first side member 150, the second side member 152, and the first end member 154 of the lower frame portion 108 of the frame assembly 102 can be configured to be removably coupleable together using connectors that can include a plurality of bolts or screws and/or a plurality of brackets. Further, the first side member 160, the second side member 162, the first end member 164, and the second end member 166 of the upper frame portion 110 of the frame assembly 102 can be configured to be removably coupleable together using connectors that can include a plurality of bolts or screws and/or a plurality of brackets.

Figure 5A:
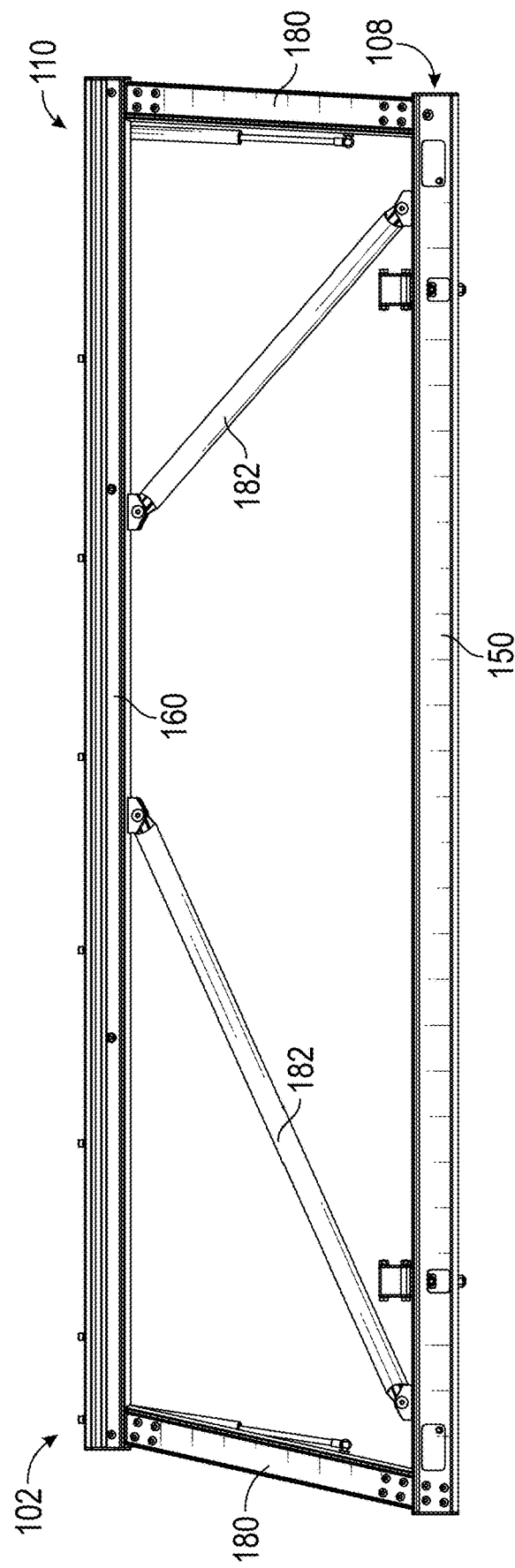
FIG. 5A is a side view of the frame assembly of the embodiment of the roof top tent system shown in FIGS. 1A-1D.
Figure 5B:
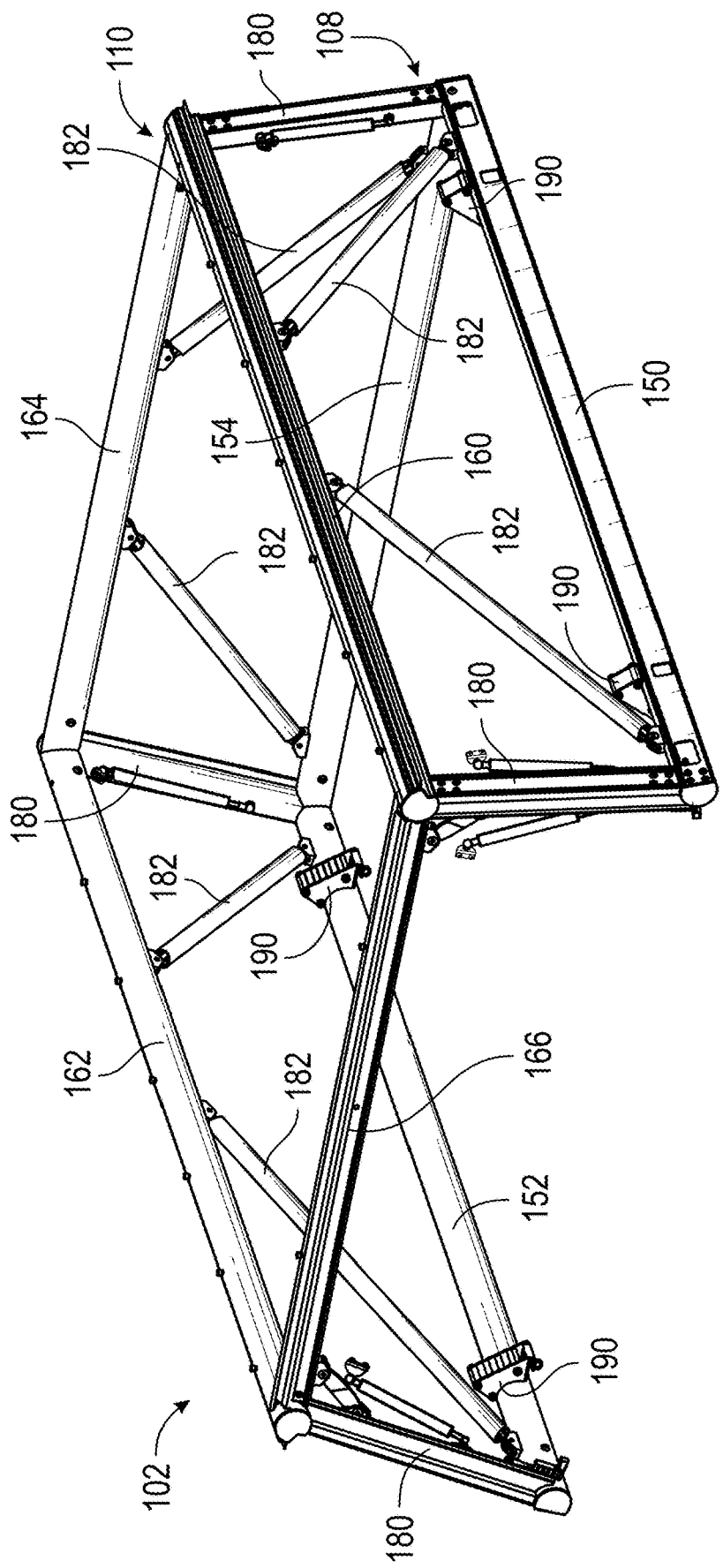
FIG. 5B is an orthogonal view of the frame assembly of the embodiment of the roof top tent system shown in FIGS. 1A-1D.

With reference to FIGS. 5A and 5B, some embodiments the frame assembly 102 can include a plurality of connecting members 180 connecting the lower frame portion 108 to the upper frame portion 110 of the frame assembly 102. The plurality of connecting members 180 can include four connecting members 180, wherein each of the four connecting members 180 can be coupled with a corner portion of the lower frame portion 108 and the upper frame portion 110.

Any embodiments of the tent system 100 can further include a first pair of angled struts 182 coupling the first side member 150 of the lower frame portion 108 with the first side member 160 of the upper frame portion 110. Any embodiments of the tent system 100 can further include a second pair of angled struts 182 coupling the second side member 152 of the lower frame portion 108 with the second side member 162 of the upper frame portion 110. Any embodiments of the tent system 100 can further include a third pair of angled struts 182 coupling the first end member 154 of the lower frame portion 108 with the first end member 164 of the upper frame portion 110.

Any embodiments of the tent system 100 can further include a pair of bed clamps coupled with the frame assembly 102, the bed clamps 190 configured to selectively couple the frame assembly 102 with a bed portion of a truck. In some embodiments, bed clamps 190 can be coupled with the lower frame portion 108 of the frame assembly 102.

Platform Assembly

In some embodiments, the lower platform portion 124 can include a first side member 200, a second side member 202, a first end member 204, and a second end member 206. The upper platform portion 122 can include a first side member 210, second side member 212, a first end member 214, and a second end member 216. In some embodiments, the first side member 200, the second side member 202, the first end member 204, and the second end member 206 of the lower platform portion 124 and the first side member 210, the second side member 212, the first end member 214, and the second end member 216 of the upper platform portion 122 can be made from extruded aluminum. In some embodiments, the first side member 200, the second side member 202, the first end member 204, and the second end member 206 of the lower platform portion 124 can be configured to be removably coupleable together using connectors that can include a plurality of bolts or screws and/or a plurality of brackets. In some embodiments, the first side member 210, the second side member 212, the first end member 214, and the second end member 216 of the upper platform portion 122 can be configured to be removably coupleable together using connectors that can include a plurality of bolts or screws and/or a plurality of brackets.

Figure 2A:
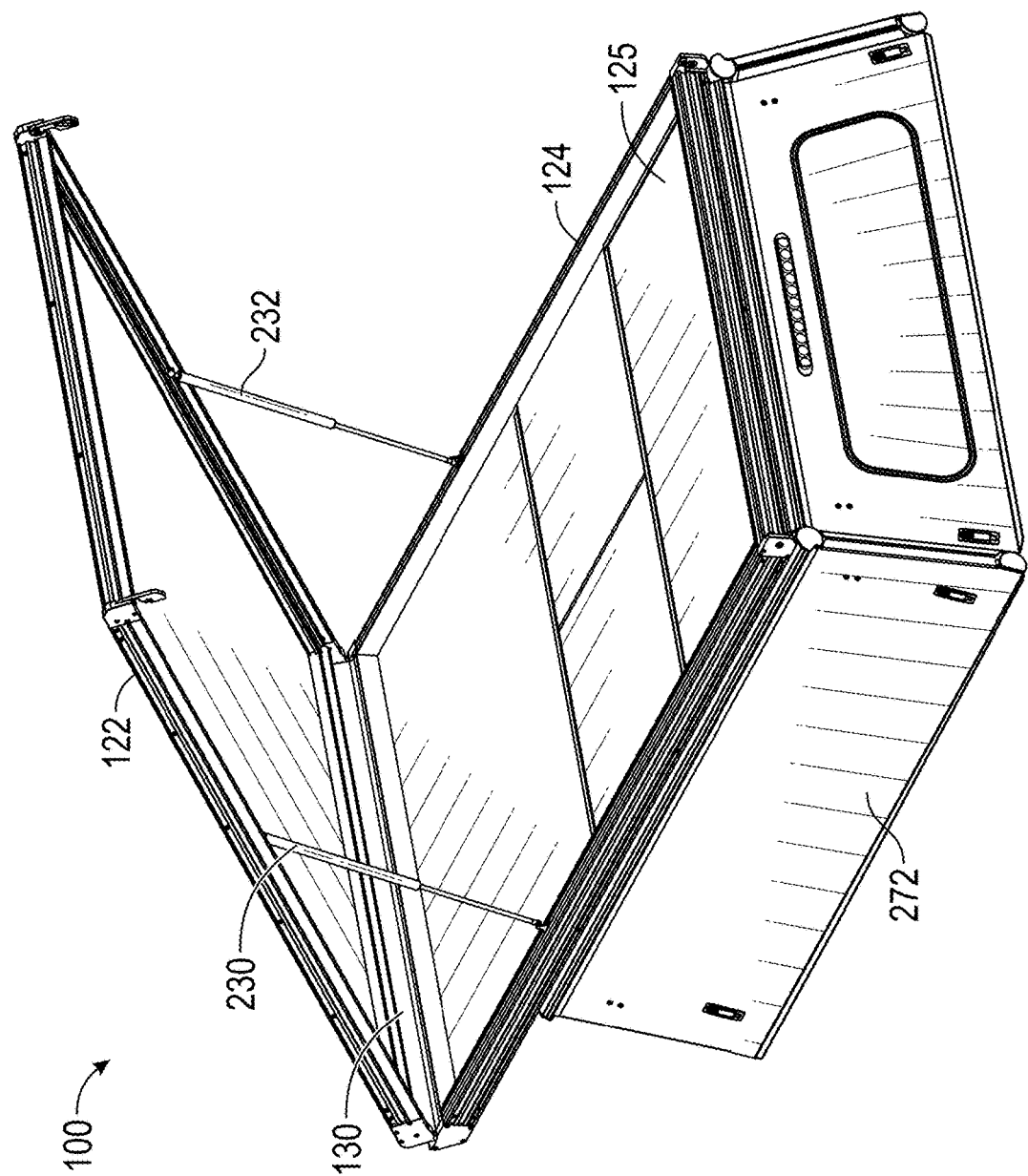
FIGS. 2A-2B are orthogonal views of the embodiment of the roof top tent system shown in FIGS. 1A-1D, with the platform assembly in an open position.
Figure 2B:
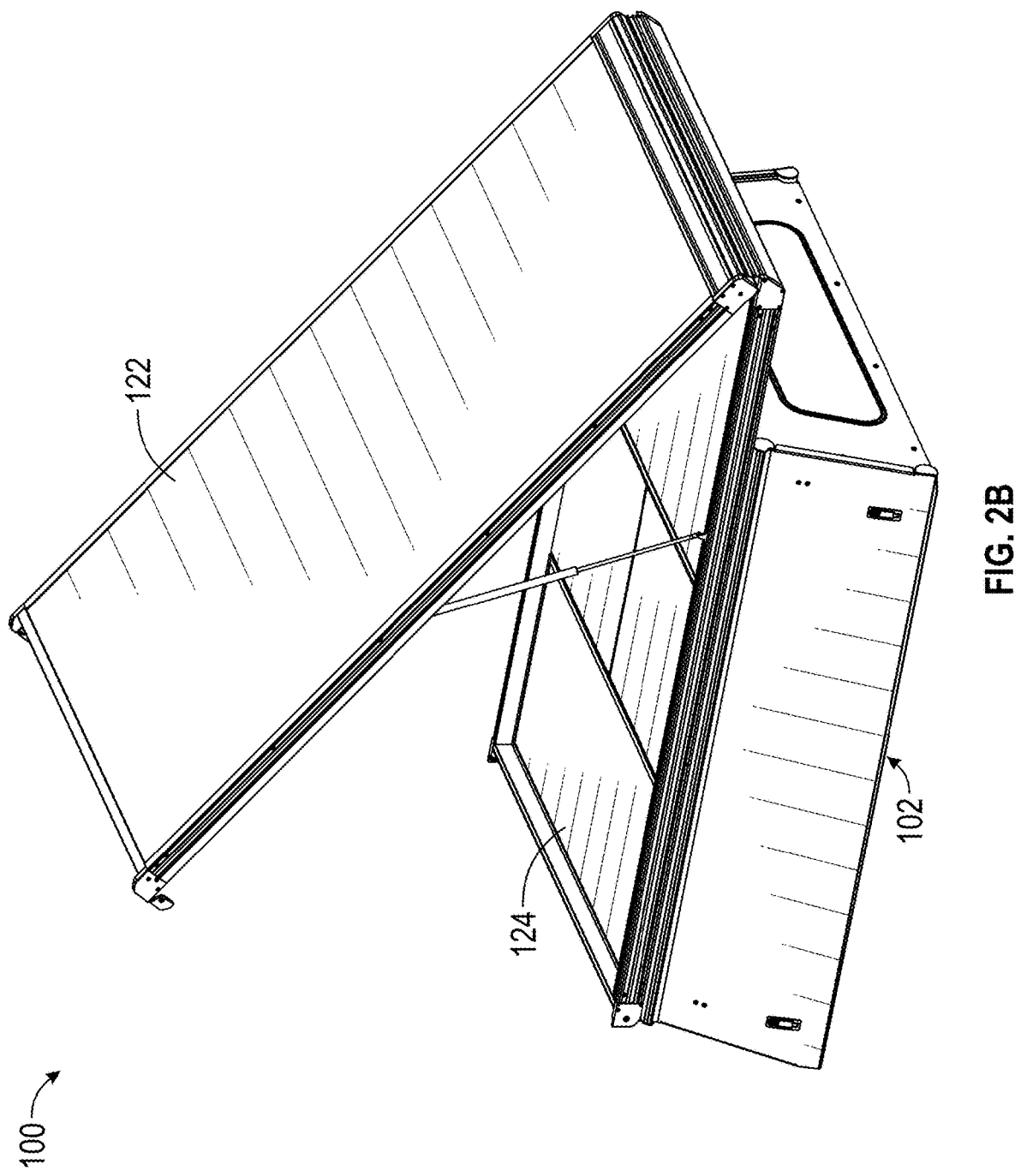
Figure 3A:
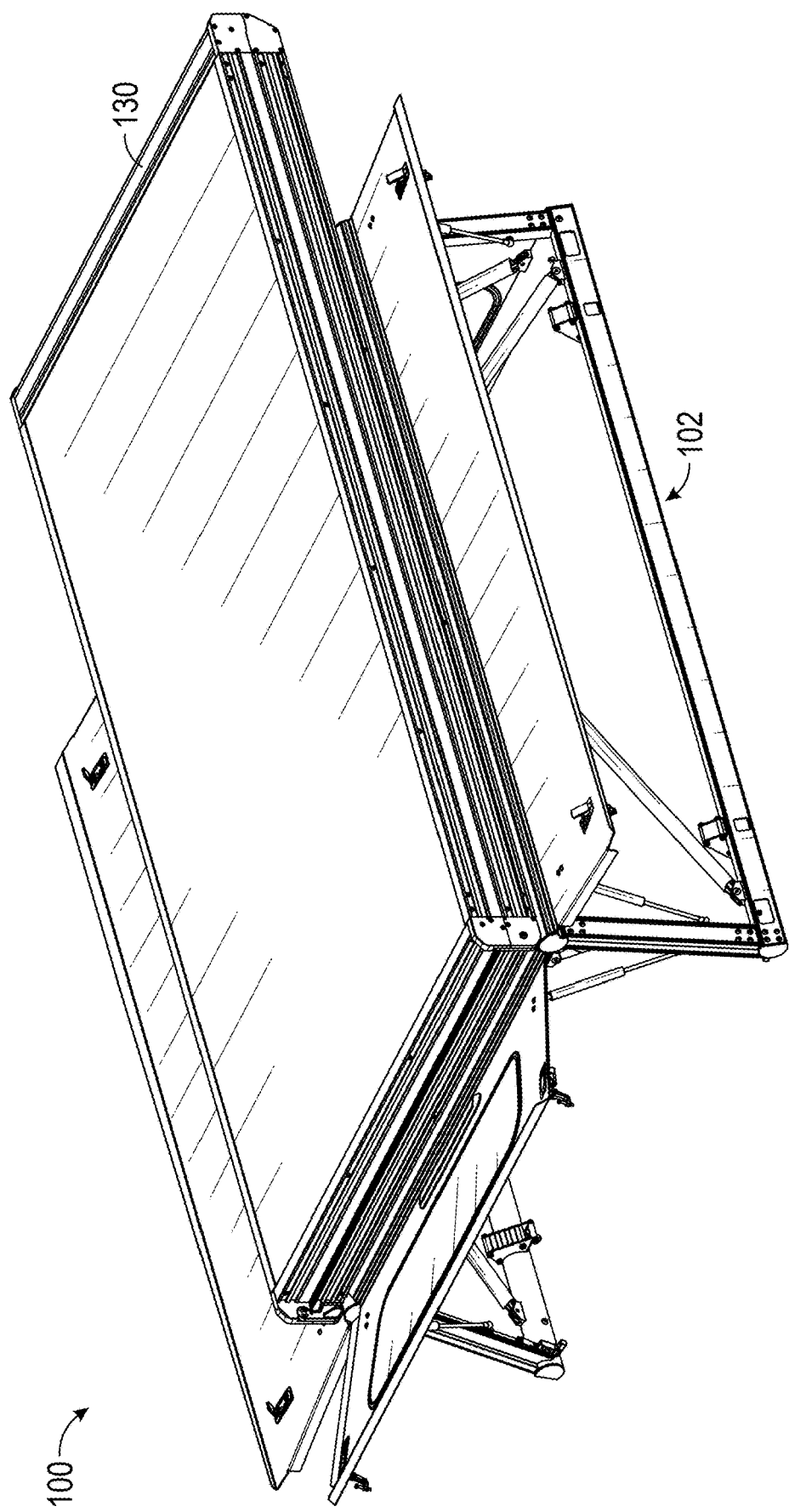
FIG. 3A is an orthogonal view of the embodiment of the roof top tent system shown in FIGS. 1A-1D, with the side and end panels in an open position.
Figure 3B:
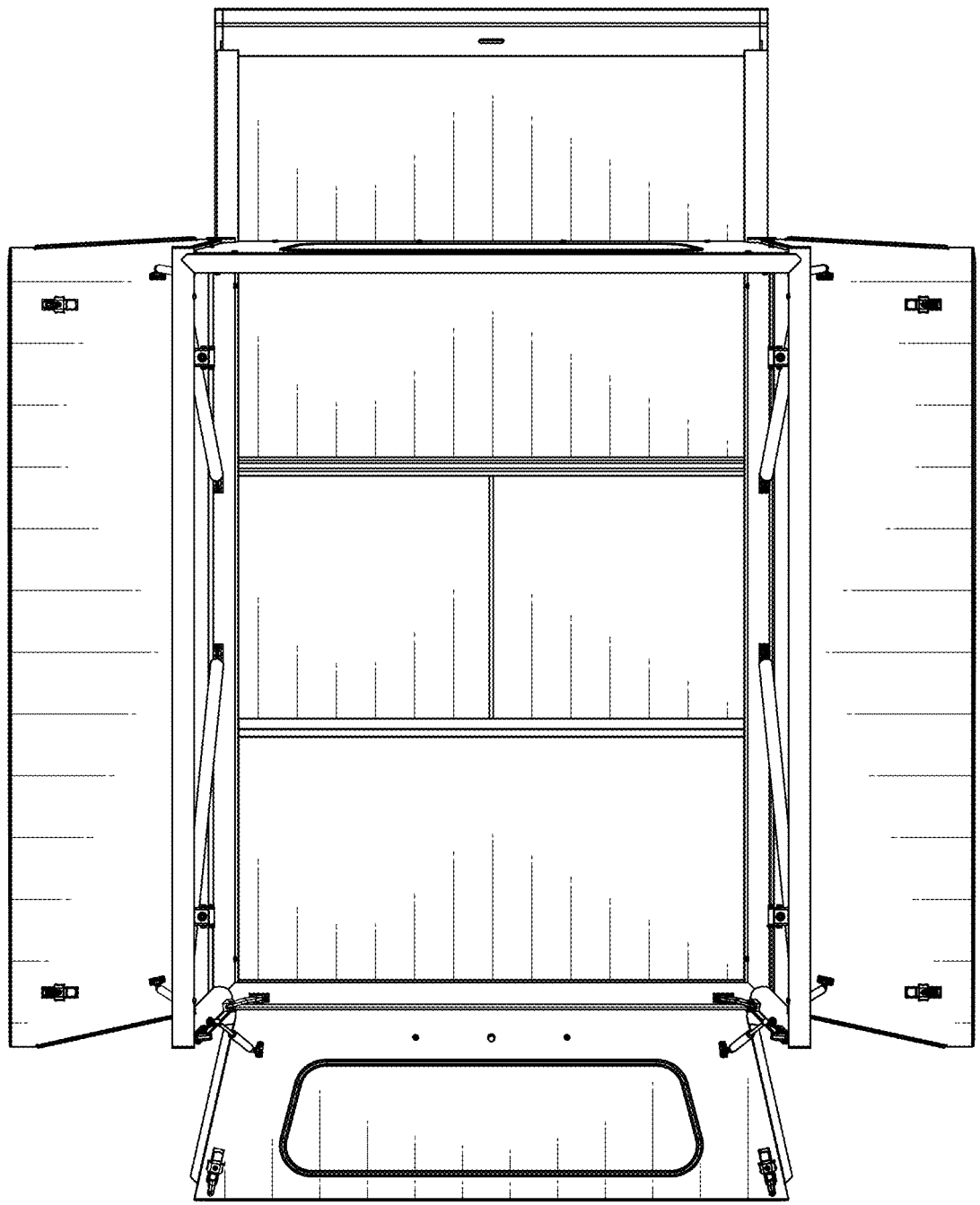
FIG. 3B is a bottom view of the embodiment of the roof top tent system shown in FIGS. 1A-1D, with the side and end panels in an open position.
Figure 3C:
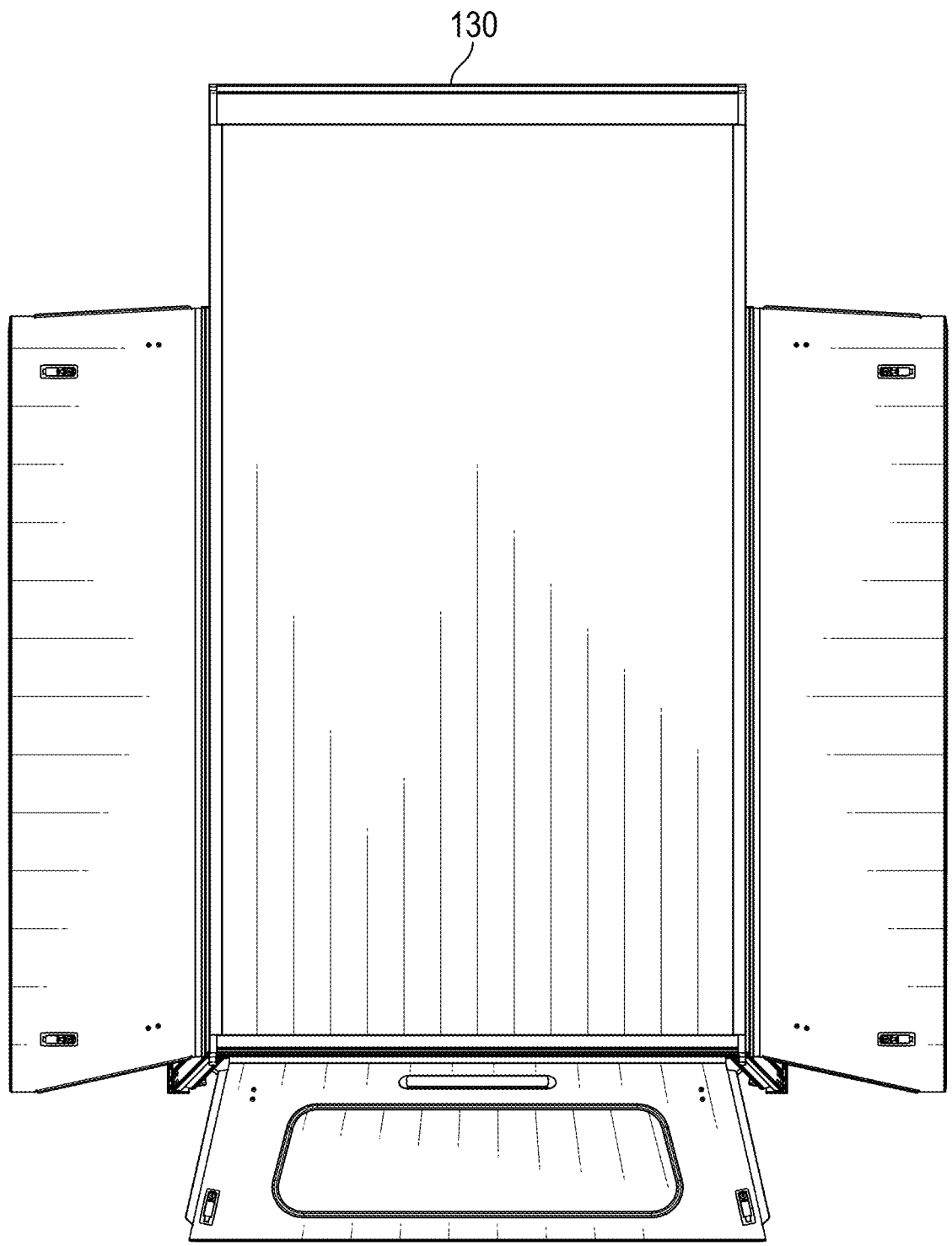
FIG. 3C is a top view of the embodiment of the roof top tent system shown in FIGS. 1A-1D, with the side and end panels in an open position.
Figure 3D:
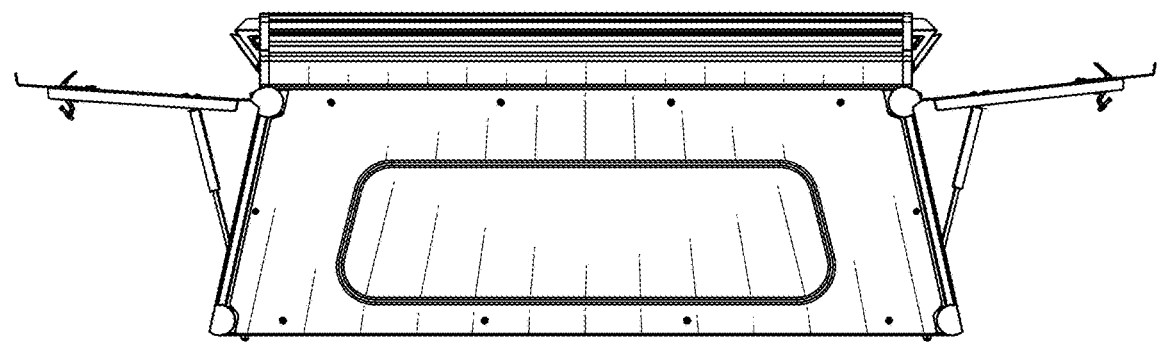
FIG. 3D is a back end view of the embodiment of the roof top tent system shown in FIGS. 1A-1D, with the side and end panels in an open position.
Figure 3E:
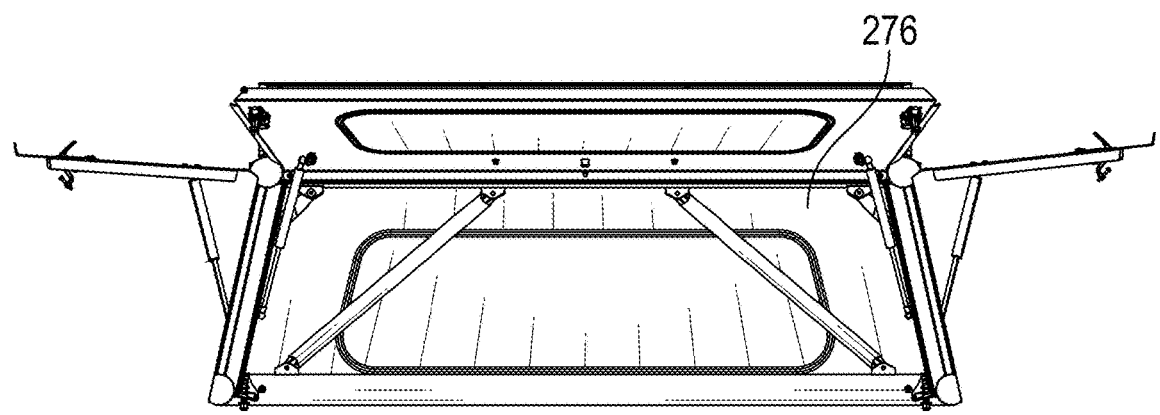
FIG. 3E is a front end view of the embodiment of the roof top tent system shown in FIGS. 1A-1D, with the side and end panels in an open position.
Figure 3F:
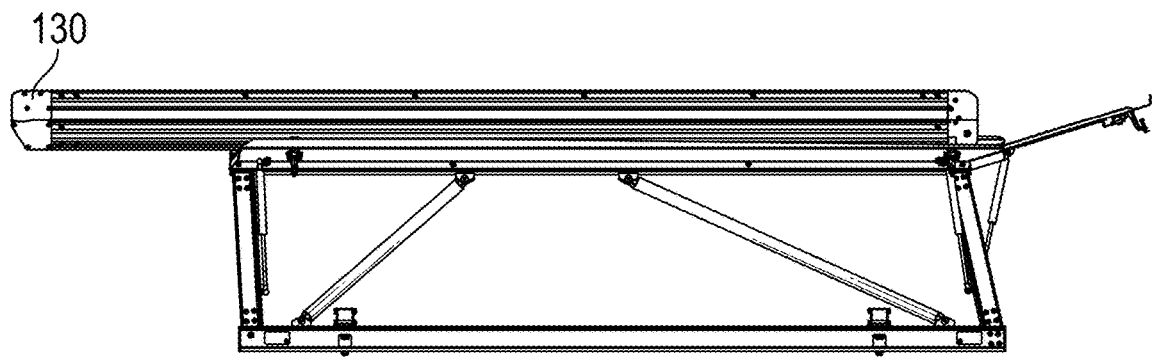
FIG. 3F is a first side view of the embodiment of the roof top tent system shown in FIGS. 1A-1D, with the side and end panels in an open position.
Figure 3G:
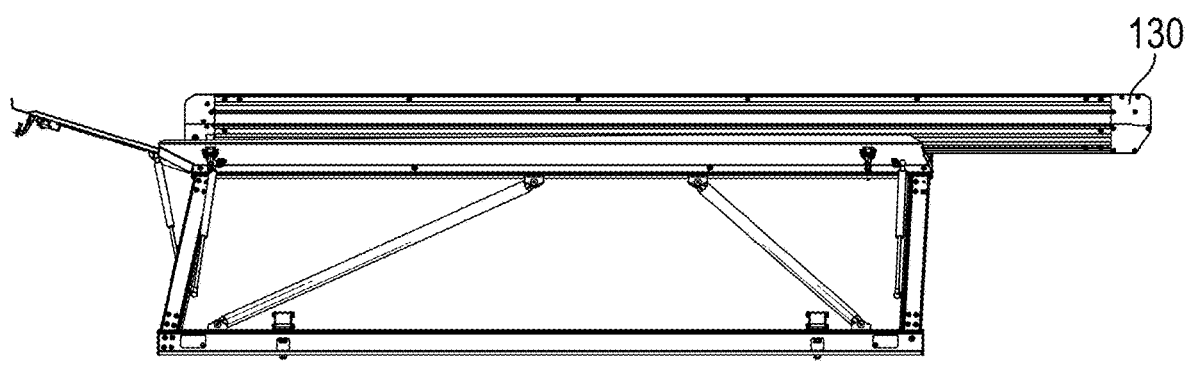
FIG. 3G is a second side view of the embodiment of the roof top tent system shown in FIGS. 1A-1D, with the side and end panels in an open position.
Figure 4A:
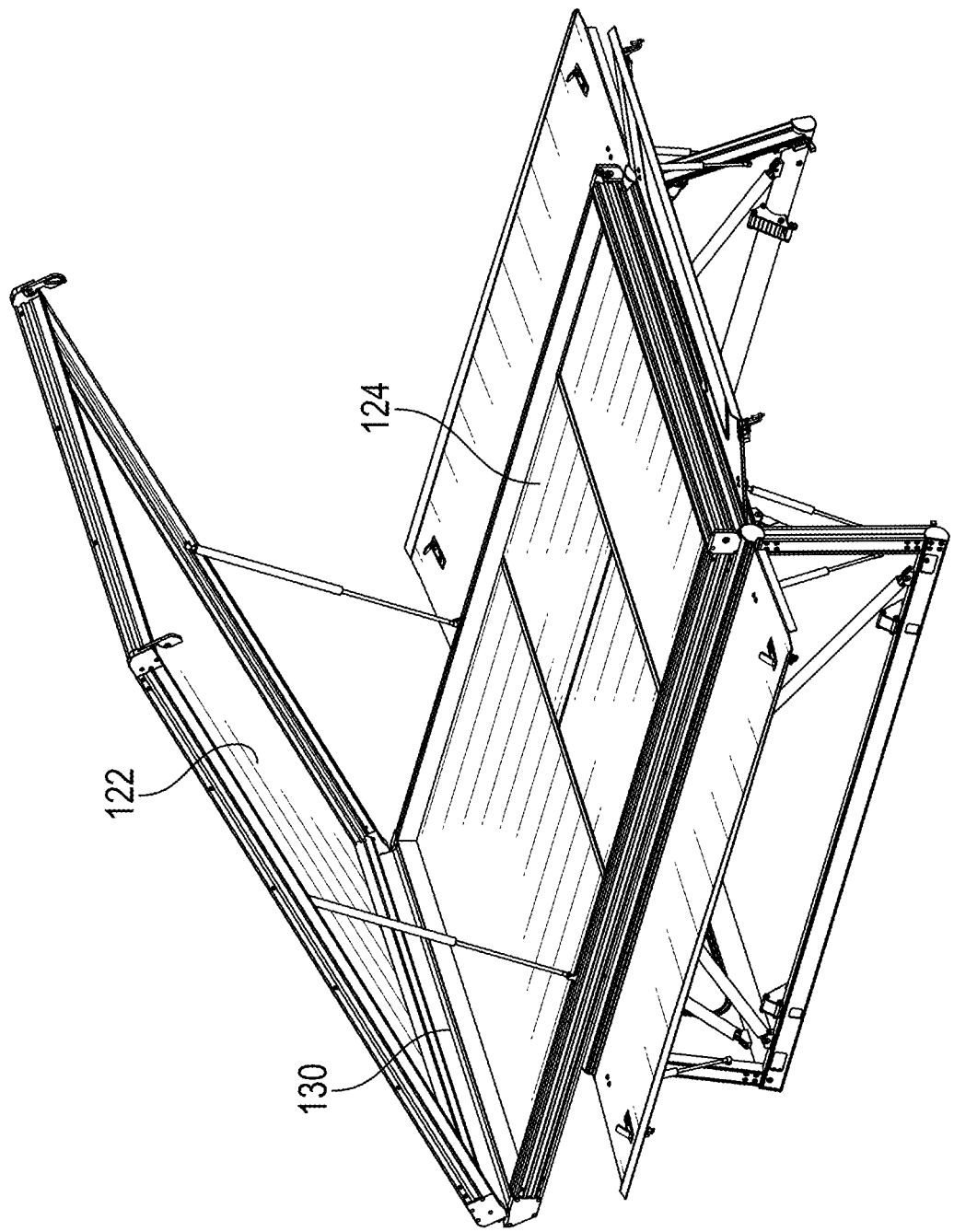
FIG. 4A is an orthogonal view of the embodiment of the roof top tent system shown in FIGS. 1A-1D, with the side and end panel in an open position and the platform assembly in an open position.

With reference to FIG. 2A, any embodiments of the tent system 100 can further include a first lift strut 230 and a second lift strut 232 configured to bias the upper platform portion 122 toward the second position. An example of the second position is shown in FIG. 2A. In some embodiments, the first and second lift struts 230, 232 can be coupled with an inside surface of the upper platform portion 122 and the lower platform portion 124. Any embodiments of the tent system 100 can further include at least one latch element configured to selectively secure the upper platform portion 122 in the first position. An example of the first position is shown in FIG. 1A. In some embodiments, the platform assembly 120 can further include a honeycomb roof panel and a clamp mechanism configured to couple the honeycomb roof panel to the lower platform portion 124 of the platform assembly 120.

Hinge Details

With reference to FIG. 6B, some embodiments of the platform hinge 130 can further include a connecting element 240 having a first rounded projection 242 configured to be received within a first rounded slot 244 in the second platform hinge member 134 and a second rounded projection 246 configured to be received within a second rounded slot 248 in the first platform hinge member 132. In some embodiments, the platform hinge connecting element 240 can include a projection 250 configured to limit an angle of rotation of the second platform hinge member 134 and the upper platform portion 122 relative to the first platform hinge member 132 and the lower platform portion 124. In some embodiments, the platform hinge 130 can extend along all or substantially all of a length of the first end portion of the lower platform portion 124 and the upper platform portion 122. In some embodiments, the platform hinge 130 can further include a projection configured to partially cover and direct water away from the platform hinge 130.

Side and End Panels

Any embodiments of the tent system 100 can further include a first side panel 270 supported by a first side of the frame assembly 102, a second side panel 272 supported by a second side of the frame assembly 102 opposite to the first side of the frame assembly 102, a first end panel 274 supported by a first end of the frame, and a second end panel 276 supported by a second end of the frame assembly 102. In some embodiments, the first and second side panels 270, 272 and/or the first and second end panels 274, 276 can be made from aluminum and can be removable from the frame assembly 102 easily with the use of standard tools. In some embodiments, the first and second side panels 270, 272 and/or the first and second end panels 274, 276 can be removable from the frame assembly 102 without the use of any tools. Any embodiments of the tent system 100 can further include at least one lift strut configured to bias the first end panel 274 toward the open position, at least one lift strut configured to bias the first side panel 270 toward the open position, and at least one lift strut configured to bias the second side panel 272 toward the open position.

Any embodiments of the tent system 100 can further include at least one latch element configured to selectively secure the first end panel 274 in the closed position, at least one latch element configured to selectively secure the first side panel 270 in the closed position, and at least one latch element configured to selectively secure the second side panel 272 in the closed position.

First End Panel

In some embodiments, the first end panel 274 is selectively movable or rotatable relative to the frame assembly 102 between an open and a closed position. With reference to FIG. 6A, any embodiments of the tent system 100 can further include an end panel hinge 280 adjacent to a top edge portion of the first end panel 274 configured to hingedly couple the first end panel 274 with the frame assembly 102 so that the first end panel 274 can rotate between the open and closed positions. In some embodiments, the end panel hinge 280 that can include a first hinge member 282 that can be coupleable with the upper frame portion 110 and can include a plurality of gear teeth 140, and a second hinge member 284 that can be coupleable with the first end panel 274 and can include a plurality of gear teeth 140 configured to mesh with the plurality of gear teeth 140 of the first hinge member of the end panel hinge 280.

In some embodiments, the end panel hinge 280 can further include a connecting element 288 having a first rounded projection 290 configured to be received within a first rounded slot 292 in the first hinge member 282 of the end panel hinge 280 and a second rounded projection 294 configured to be received within a second rounded slot 296 in the second hinge member 284 of the end panel hinge 280. In some embodiments, the connecting element 288 of the end panel hinge 280 can include a projection 300 configured to limit an angle of rotation of the second hinge member of the end panel hinge 280 and the first end panel 274 relative to the first hinge member of the end panel hinge 280. In some embodiments, the end panel hinge 280 can extend along all or substantially all of a length of the first end panel 274. In some embodiments, the end panel hinge 280 can further include a projection 304 configured to partially cover and direct water away from the end panel hinge 280. In some embodiments, the first end panel 274 can include at least one bend to increase a rigidity of the first end panel 274.

First Side Panel

In some embodiments, the first side panel 270 is selectively movable or rotatable relative to the frame assembly 102 between an open and a closed position. With reference to FIG. 6A, any embodiments of the tent system 100 can further include a first side panel hinge 310 adjacent to a top edge portion of the first side panel 270 configured to hingedly couple the first side panel 270 with the frame assembly 102 so that the first side panel 270 can rotate between the open and closed positions. The first side panel hinge 310 can include a first hinge member 312 that can be coupleable with the upper frame portion 110 and can include a plurality of gear teeth 140, and a second hinge member 314 that can be coupleable with the first side panel 270 and can include a plurality of gear teeth 140 configured to mesh with the plurality of gear teeth 140 of the first hinge member 312 of the first side panel hinge 310.

In some embodiments, the first side panel hinge 310 can further include a connecting element 318 having a first rounded projection 320 configured to be received within a first rounded slot 322 in the first hinge member 312 of the first side panel hinge 310 and a second rounded projection 326 configured to be received within a second rounded slot 328 in the second hinge member 314 of the first side panel hinge 310. In some embodiments, the connecting element 318 of the first side panel hinge 310 can include a projection 334 configured to limit an angle of rotation of the second hinge member of the first side panel hinge 310 and the first side panel 270 relative to the first hinge member of the first side panel hinge 310. In some embodiments, the first side panel hinge 310 can extend along all or substantially all of a length of the first side panel 270. In some embodiments, the first side panel hinge 310 can further include a projection 340 configured to partially cover and direct water away from the first side panel hinge 310. In some embodiments, the first side panel 270 can include at least one bend to increase a rigidity of the first side panel 270.

Second Side Panel

In some embodiments, each of the second side panel 272 is selectively movable or rotatable relative to the frame assembly 102 between an open and a closed position. Any embodiments of the tent system 100 can further include a second side panel hinge similar to the first side panel hinge adjacent to a top edge portion of the second side panel 272 configured to hingedly couple the second side panel 272 with the frame assembly 102 so that the second side panel 272 can rotate between the open and closed positions. In some embodiments, the second side panel hinge that can include a first hinge member that can be coupleable with the upper frame portion 110 and can include a plurality of gear teeth 140, and a second hinge member that can be coupleable with the second side panel 272 and can include a plurality of gear teeth 140 configured to mesh with the plurality of gear teeth 140 of the first hinge member of the second side panel hinge.

In some embodiments, the second side panel hinge can further include a connecting element having a first rounded projection configured to be received within a first rounded slot in the first hinge member of the second side panel hinge and a second rounded projection configured to be received within a second rounded slot in the second hinge member of the second side panel hinge. In some embodiments, the connecting element of the second side panel hinge can include a projection configured to limit an angle of rotation of the second hinge member of the second side panel hinge and the second side panel 272 relative to the first hinge member of the second side panel hinge. In some embodiments, the second side panel hinge can extend along all or substantially all of a length of the second side panel 272. In some embodiments, the second side panel hinge can further include a projection configured to partially cover and direct water away from the second side panel hinge. Any embodiments of the second side panel hinge can have any of the same features, components, and/or other details of the first side panel hinge. In some embodiments, the second side panel 272 can include at least one bend to increase a rigidity of the second side panel 272.

Accessory Track

Figure 7A:
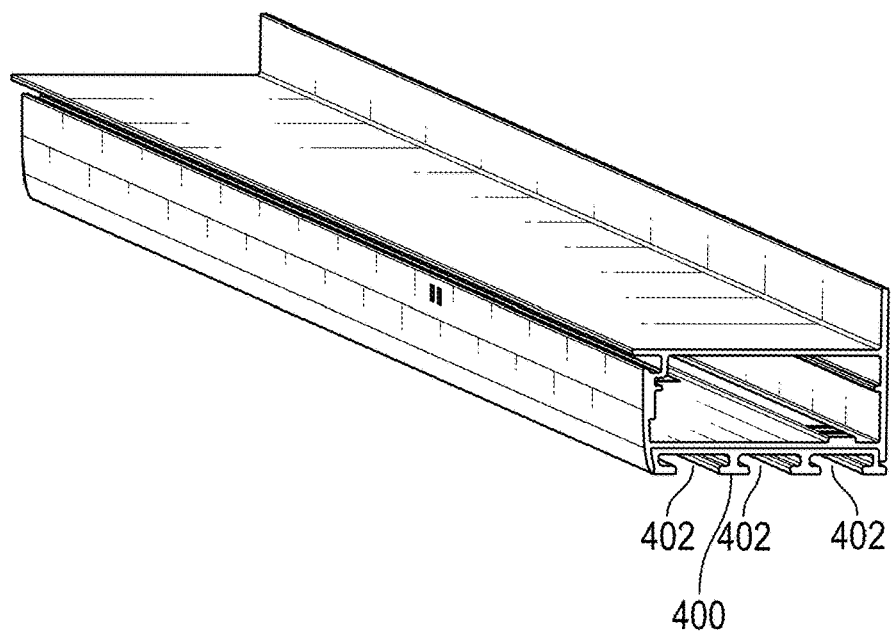
FIGS. 7A-7C show an embodiment of a removable accessory track that can be used with any embodiments of the roof top tent system disclosed herein.
Figure 7B:
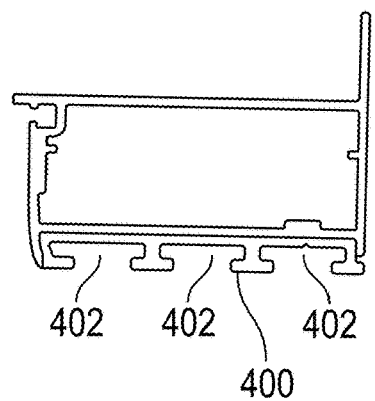
Figure 7C:
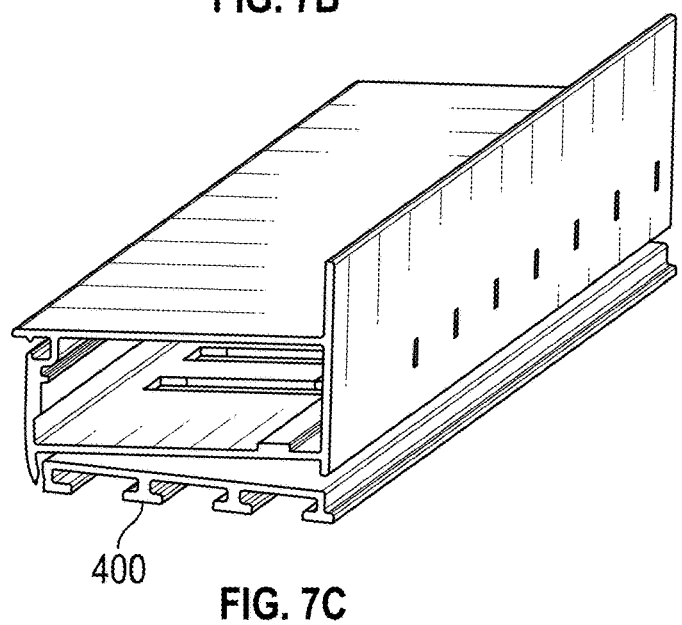

With reference to FIGS. 7A-7C, any embodiments of the tent system 100 can further include a removable accessory track 400. The accessory track 400 can be configured to be coupleable with a side member of the lower platform portion 124, for example and without limitation, including the first side member 150 and/or the second side member 152. In some embodiments, the accessory track 400 can extend along all or substantially all of a length of the side member of the lower platform portion 124. The accessory track can be configured to be coupled with or removably fastened to any of a plurality of different frame members of the tent system 100, including on the front end of the frame, the back end of the frame, either sides of the frame, with any members of the platform or otherwise. In some embodiments, the accessory track can be removably coupleable with the first or second side member 150, 152 of the lower platform portion 124, or any portion of the upper frame portion 110, including without limitation the first side member 160 or the second side member 162 of the upper frame portion 110. In some embodiments, the side member of the lower platform portion 124 or any other member of the tent device 100 can include a channel sized and configured to receive and support the accessory track. In some embodiments, the accessory track 400 can include one or more slots or channels 402 therein configured to receive connector elements so that a user can couple one or more accessories to the accessory track 400. For example and without limitation, the accessory track 400 can be configured to receive and/or support other components and accessories such as awnings, gear racks or cabinets, ski and/or snowboard racks, surfboard or other board racks, etc. (collectively referred to as accessories). In some embodiments, the slots 402 can extend an entire length of any of the accessory tracks 400 included in the tent system 100. In some embodiments, the awning or other component or accessory can have fasteners or features that snap into, fit into, or otherwise couple with the channels of the accessory track 400 and/or the channels of the side members, end member, other components of the tent system 100, without the use of the accessory track 400. In any embodiments, the accessory track can be made from extruded aluminum.

Upper Panel Clamp

Figure 8A:
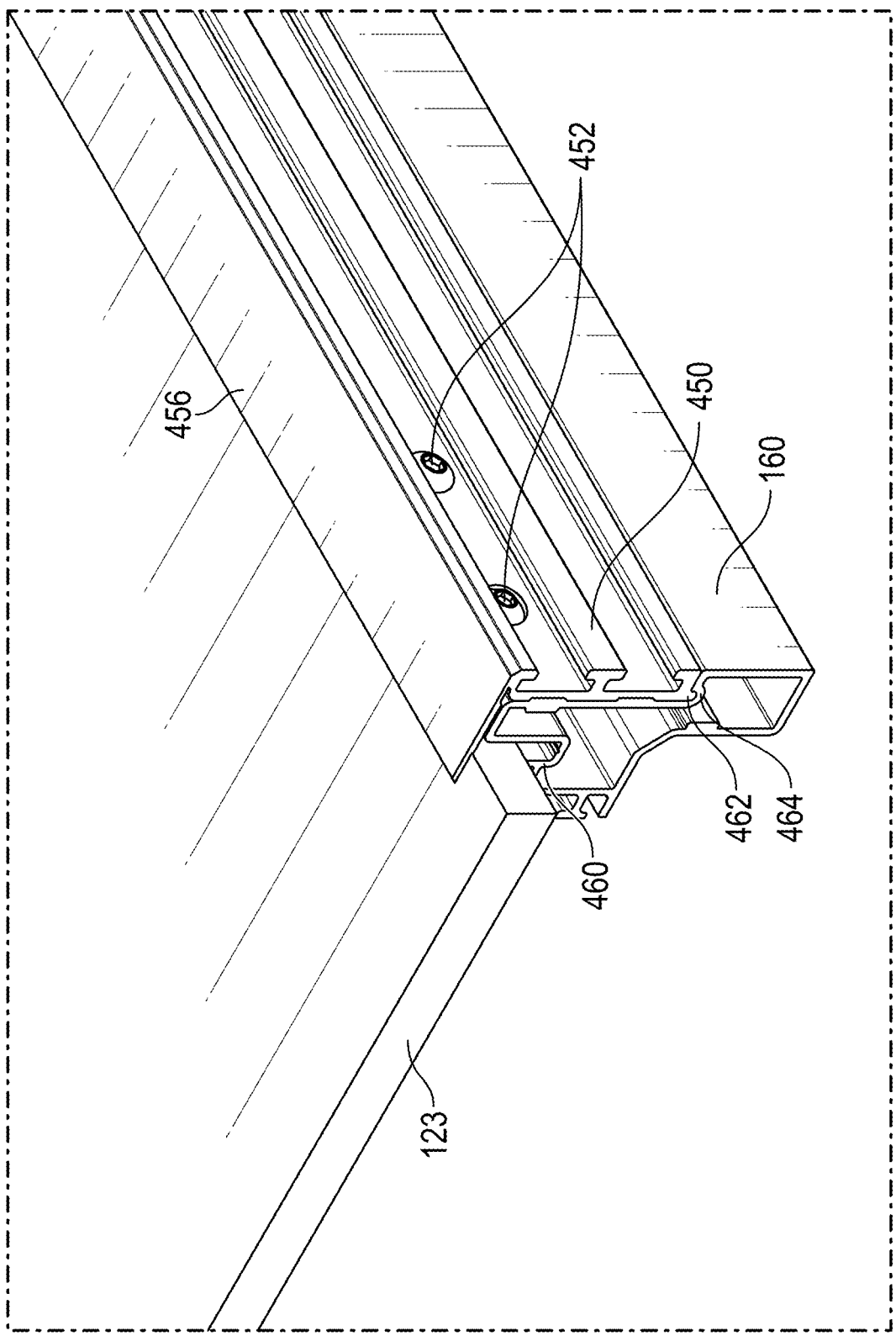

With reference to FIGS. 8A-8C, any embodiments of the tent system 100 can include a clamp element 450 that can be used to secure or couple the upper panel 123 with the upper frame portion 110. FIG. 8A is an isometric view of the portion of the tent system 100 showing the clamp element 450 clamping an edge portion of the upper panel 123 to the first side member 160 of the upper frame portion 110. FIG. 8B shows the clamping element 450 in an open or first state or position, and FIG. 8C shows the clamping element 450 in a closed or second state or position.

In any embodiments disclosed herein, the clamp element 450 can be secured to at least the first side member 160 and second side member 162 of the upper frame portion 110. For example and without limitation, the clamp element 450 (which is also referred to herein as the first clamp element 450) can be secured to at least the first side member 160 and second side member 162 of the upper frame portion 110 using a plurality of fasteners 452, which can be screws, and can have an upper extension 456 that is configured to extend over an edge of the upper panel 123 and clamp or sandwich at least an edge portion of the upper panel 123 between the upper extension 456 and a ledge or support portion 460 of the first side member 160. Similar components (for example, a second clamp element, a third clamp element, and/or a fourth clamp element, without limitation) can be used to couple or clamp the upper panel 123 to the second side member 162, the first end member 164, and/or the second end member 166 of the upper frame portion 110. Additionally, in any embodiments, the clamp elements can have one or more slots or channels 470 (two slots being shown) therein that can be configured to receive connector elements so that a user can couple one or more accessories to the slots 470, similar to the one or more slots 402 of the accessory track 400.

Other Details

Any embodiments of the tent system 100 can further include a plurality of seals coupled with a plurality of channels in the frame assembly 102, the plurality of seals configured to inhibit water, dust and other contaminants from entering the roof top tent system. Further, any embodiments of the tent system 100 can further include one or more billet members or caps coupled with one or more end portions of the frame assembly 102.

In some embodiments, the tent system 100 can include a fabric cover (not shown) covering at least the upper platform portion 122 and extending from the upper platform portion 122 to the lower platform portion 124 to form an openable enclosure between the upper platform portion 122 and the lower platform portion 124. In some embodiments, the fabric cover can include at least one zippered openings therein. In some embodiments, the fabric cover can be coupled with the frame assembly 102 using a keder cord configured to couple with one or more track features of the lower platform portion 124 and the upper platform portion 122 of the platform assembly 120.

In some embodiments, tent system can be configured to be shippable in a flat package and assemblable by the end user. This can significantly reduce the shipping volume.

While certain embodiments of the inventions have been described, these embodiments have been presented by way of example only, and are not intended to limit the scope of the disclosure. Indeed, the novel methods and systems described herein may be embodied in a variety of other forms. Furthermore, various omissions, substitutions and changes in the systems and methods described herein may be made without departing from the spirit of the disclosure. The accompanying claims and their equivalents are intended to cover such forms or modifications as would fall within the scope and spirit of the disclosure. Accordingly, the scope of the present inventions is defined only by reference to the appended claims.

Features, materials, characteristics, or groups described in conjunction with a particular aspect, embodiment, or example are to be understood to be applicable to any other aspect, embodiment or example described in this section or elsewhere in this specification unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The protection is not restricted to the details of any foregoing embodiments. The protection extends to any novel one, or any novel combination, of the features disclosed in this specification (including any accompanying claims, abstract and drawings), or to any novel one, or any novel combination, of the steps of any method or process so disclosed.

Furthermore, certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations, one or more features from a claimed combination can, in some cases, be excised from the combination, and the combination may be claimed as a subcombination or variation of a subcombination.

Moreover, while operations may be depicted in the drawings or described in the specification in a particular order, such operations need not be performed in the particular order shown or in sequential order, or that all operations be performed, to achieve desirable results. Other operations that are not depicted or described can be incorporated in the example methods and processes. For example, one or more additional operations can be performed before, after, simultaneously, or between any of the described operations. Further, the operations may be rearranged or reordered in other implementations. Those skilled in the art will appreciate that in some embodiments, the actual steps taken in the processes illustrated and/or disclosed may differ from those shown in the figures. Depending on the embodiment, certain of the steps described above may be removed, others may be added. Furthermore, the features and attributes of the specific embodiments disclosed above may be combined in different ways to form additional embodiments, all of which fall within the scope of the present disclosure. Also, the separation of various system components in the implementations described above should not be understood as requiring such separation in all implementations, and it should be understood that the described components and systems can generally be integrated together in a single product or packaged into multiple products.

For purposes of this disclosure, certain aspects, advantages, and novel features are described herein. Not necessarily all such advantages may be achieved in accordance with any particular embodiment. Thus, for example, those skilled in the art will recognize that the disclosure may be embodied or carried out in a manner that achieves one advantage or a group of advantages as taught herein without necessarily achieving other advantages as may be taught or suggested herein.

Conditional language, such as "can," "could," "might," or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require the presence of at least one of X, at least one of Y, and at least one of Z.

Language of degree used herein, such as the terms "approximately," "about," "generally," and "substantially" as used herein represent a value, amount, or characteristic close to the stated value, amount, or characteristic that still performs a desired function or achieves a desired result. For example, the terms "approximately", "about", "generally," and "substantially" may refer to an amount that is within less than 10% of, within less than 5% of, within less than 1% of, within less than 0.1% of, and within less than 0.01% of the stated amount. As another example, in certain embodiments, the terms "generally parallel" and "substantially parallel" refer to a value, amount, or characteristic that departs from exactly parallel by less than or equal to 15 degrees, 10 degrees, 5 degrees, 3 degrees, 1 degree, or 0.1 degree. The ranges disclosed herein also encompass any and all overlap, sub-ranges, and combinations thereof, and any specific values within those ranges. Language such as "up to," "at least," "greater than," "less than," "between," and the like includes the number recited. Numbers and values used herein preceded by a term such as "about" or "approximately" include the recited numbers. For example, "approximately 7 mm" includes "7 mm" and numbers and ranges preceded by a term such as "about" or "approximately" should be interpreted as disclosing numbers and ranges with or without such a term in front of the number or value such that this application supports claiming the numbers, values and ranges disclosed in the specification and/or claims with or without the term such as "about" or "approximately" before such numbers, values or ranges such, for example, that "approximately two times to approximately five times" also includes the disclosure of the range of "two times to five times." The scope of the present disclosure is not intended to be limited by the specific disclosures of preferred embodiments in this section or elsewhere in this specification, and may be defined by claims as presented in this section or elsewhere in this specification or as presented in the future. The language of the claims is to be interpreted broadly based on the language employed in the claims and not limited to the examples described in the present specification or during the prosecution of the application, which examples are to be construed as non-exclusive.

The scope of the present disclosure is not intended to be limited by the specific disclosures of preferred embodiments in this section or elsewhere in this specification, and may be defined by claims as presented in this section or elsewhere in this specification or as presented in the future. The language of the claims is to be interpreted broadly based on the language employed in the claims and not limited to the examples described in the present specification or during the prosecution of the application, which examples are to be construed as non-exclusive.

What is claimed is:

1. A roof top tent system, comprising:
    a frame assembly coupleable with a bed of a truck comprising:
        a lower frame portion; and
        an upper frame portion;
    a platform assembly coupleable with the frame assembly, the platform assembly comprising:
        a lower platform portion coupleable with the upper frame portion of the frame assembly;
        an upper platform portion hingedly coupled with the lower platform portion along a first end portion of the lower and upper platform portions; and
        a platform hinge configured to hingedly couple the lower platform portion with the upper platform portion, the platform hinge comprising:
            a first hinge member that is coupled with the lower platform portion and comprises a plurality of gear teeth; and
            a second hinge member that is coupled with the upper platform portion and comprises a plurality of gear teeth configured to engage with and rotate about the plurality of gear teeth of the first hinge member; and a cover extending from the upper platform portion to the lower platform portion to form an openable enclosure between the upper and lower platform portions.

2. The roof top tent system of claim 1, wherein the upper platform portion can rotate between a first position in which the upper platform portion is substantially parallel to and adjacent to the lower platform portion and a second position in which the upper platform portion extends at an angle away from the lower platform portion.

3. The roof top tent system of claim 1, wherein the first hinge member and the second hinge member are made from extruded aluminum and extend along an entire length of a first end of the lower platform portion and a first end of the upper platform portion, respectively.

4. The roof top tent system of claim 1, wherein the first hinge member further comprises a projection that extends along an entire length of the first hinge member and is configured to cover at least the first hinge member and to divert water away from the plurality of gear teeth of the first hinge member.

5. The roof top tent system of claim 1, wherein the first hinge member is a fixed hinge.

6. The roof top tent system of claim 1, wherein the platform hinge further comprises a connecting element coupled with the first hinge member and the second hinge member, wherein the connecting element extends along an entire length of the first hinge member and the second hinge member.

7. The roof top tent system of claim 6, wherein the connecting element is made from extruded aluminum.

8. The roof top tent system of claim 6, wherein the connecting element comprises:
a first rounded projection extending along an entire length of the connecting element configured to be received within a rounded slot that extends along an entire length of the first hinge member; and
a second rounded projection extending along an entire length of the connecting element configured to be received within a rounded slot that extends along an entire length of the second hinge member.

9. The roof top tent system of claim 6, wherein the connecting element further comprises a projection extending along an entire length of the connecting element configured to limit an angle of rotation of the upper platform portion relative to the lower platform portion.

10. The roof top tent system of claim 1, further comprising one or more lift struts coupled with the upper platform portion and configured to bias the upper platform portion to rotate away from the lower platform portion.

11. The roof top tent system of claim 1, further comprising at least one latch element configured to selectively secure the upper platform portion in a first position in which the upper platform portion is substantially parallel to and adjacent to the lower platform portion.

12. The roof top tent system of claim 1, further comprising an upper panel and one or more clamp mechanisms configured to couple the upper panel to the upper frame portion.

13. The roof top tent system of claim 12, wherein the one or more clamp mechanisms comprise one or more slots therein, wherein the one or more slots are configured to receive one or more connector elements.

14. The roof top tent system of claim 13, wherein the one or more clamp mechanisms comprise an upper element couplable with a first side member of the upper frame portion, the upper element configured to extend over an edge of the upper panel and clamp at least an edge portion of the upper panel between the upper element and the first side member.

15. A roof top tent system, comprising:
a frame assembly coupleable with a bed of a truck comprising a lower frame portion and an upper frame portion;
a platform assembly coupled with the frame assembly, comprising:
an upper platform portion;
a lower platform portion coupleable with the upper frame portion of the frame assembly along a first end portion of the lower and upper platform portions; and
a platform hinge configured to hingedly couple the lower platform portion with the upper platform portion so that the upper platform portion can rotate between a first position in which the upper platform portion is substantially parallel to and adjacent to the lower platform portion and a second position in which the upper platform portion extends at a non-zero degree angle away from the lower platform portion;
a cover covering at least the upper platform portion and extending from the upper platform portion to the lower platform portion to form an openable enclosure between the upper and lower platform portions; and
a removable accessory track coupleable with the frame assembly, and
wherein the lower frame portion comprises a first side member, a second side member, and a first end member made from extruded aluminum and the upper frame portion comprises a first side member, second side member, a first end member, and a second end member made from extruded aluminum.

16. The roof top tent system of claim 15, wherein the removable accessory track is coupleable with a side member of the lower platform portion.

17. The roof top tent system of claim 15, wherein the removable accessory track is coupleable with a portion of the upper frame portion.

18. The roof top tent system of claim 15, wherein the removable accessory track comprises a channel configured to receive connector elements.

19. A method of expanding a collapsible roof top tent system, comprising:
rotating an upper platform portion about a hinge from a first position in which the upper platform portion is adjacent to a lower platform portion to a second position in which the upper platform portion is rotated away from the lower platform portion to expand an interior space of the roof top tent system; and
supporting the upper platform portion in the second position to at least inhibit the upper platform portion from rotating back from the second position to the first position;
wherein:
the hinge comprises a first hinge member and a second hinge member, wherein the first hinge member comprises a plurality of teeth configured to mesh with and rotate about a plurality of teeth of the second hinge member as the upper platform portion is rotated relative to the lower platform portion.

20. The method of claim 19, further comprising supporting the upper platform portion in the second position via one or more lift struts to at least inhibit the upper platform portion from rotating back from the second position to the first position.

\* \* \* \* \*